(12) United States Patent
Agrawal et al.

(10) Patent No.: US 12,335,653 B2
(45) Date of Patent: Jun. 17, 2025

(54) USER IMAGE PRESENTATION BASED ON REGION PRIORITY

(71) Applicant: Motorola Mobility LLC, Chicago, IL (US)

(72) Inventors: Amit Kumar Agrawal, Bangalore (IN); Rahul Bharat Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 198 days.

(21) Appl. No.: 18/208,951

(22) Filed: Jun. 13, 2023

(65) Prior Publication Data
US 2024/0422283 A1   Dec. 19, 2024

(51) Int. Cl.
*H04N 5/272* (2006.01)

(52) U.S. Cl.
CPC .................... *H04N 5/272* (2013.01)

(58) Field of Classification Search
CPC .......................................... H04N 5/272
See application file for complete search history.

(56) References Cited

U.S. PATENT DOCUMENTS

| | | |
|---|---|---|
| 8,373,799 B2 | 2/2013 | Reponen et al. |
| 9,154,703 B2 | 10/2015 | Koda et al. |
| 9,591,181 B2 | 3/2017 | Cunningham |
| 10,165,176 B2 | 12/2018 | Frahm et al. |
| 10,198,099 B2 | 2/2019 | Sakai |
| 10,950,275 B2 | 3/2021 | Taine et al. |
| 11,379,094 B2 | 7/2022 | Fukino et al. |
| 11,483,276 B2 | 10/2022 | Adamski et al. |
| 11,509,942 B2 | 11/2022 | Evans et al. |
| 11,601,721 B2 | 3/2023 | Bloch et al. |
| 11,641,514 B1 | 5/2023 | Desai et al. |
| 11,972,636 B2 | 4/2024 | Jain et al. |
| 12,184,955 B2 | 12/2024 | Desai et al. |
| 2013/0247078 A1 | 9/2013 | Nikankin et al. |
| 2015/0213316 A1 | 7/2015 | Vunic et al. |
| 2015/0264432 A1 | 9/2015 | Cheng |
| 2016/0191958 A1 | 6/2016 | Nauseef et al. |
| 2020/0393908 A1 | 12/2020 | Kejariwal |
| 2021/0051033 A1 | 2/2021 | Backer |
| 2021/0058677 A1 | 2/2021 | Vankipuram et al. |
| 2022/0374190 A1* | 11/2022 | Rothera .............. H04M 7/0027 |
| 2023/0156297 A1 | 5/2023 | Desai et al. |

(Continued)

OTHER PUBLICATIONS

U.S. Appl. No. 17/529,542, "Non-Final Office Action", U.S. Appl. No. 17/529,542, filed Aug. 31, 2022, 9 pages.

(Continued)

*Primary Examiner* — Michael H Hong
(74) *Attorney, Agent, or Firm* — FIG. 1 Patents

(57) ABSTRACT

Techniques for user image presentation based on region priority are described and are implementable to enable an image of a user to be inserted into media content. For instance, media content is generated that includes at least one high priority region and at least one low priority region. Further, a user image is captured to be inserted into the media content. Accordingly, the user image is inserted into the at least one low priority region to avoid obstructing high priority visuals displayed within the at least one high priority region.

20 Claims, 19 Drawing Sheets

(56) References Cited

U.S. PATENT DOCUMENTS

2023/0232084 A1    7/2023  Desai et al.
2023/0388563 A1*  11/2023  Yang ................ H04N 21/23424

OTHER PUBLICATIONS

U.S. Appl. No. 17/529,542, "Notice of Allowance", U.S. Appl. No. 17/529,542, filed Mar. 21, 2023, 5 pages.
U.S. Appl. No. 18/191,156, "Notice of Allowance", U.S. Appl. No. 18/191,156, Sep. 12, 2024, 9 pages.

* cited by examiner

1300

1302
Identify one or more active visual objects within the primary content

1304
Identify the at least one high priority region to include the one or more active visual objects

Fig. 13

USER IMAGE PRESENTATION BASED ON REGION PRIORITY

BACKGROUND

Today's devices provide users with a variety of different opportunities for capturing multimedia content. For instance, a typical smart device (e.g., a smartphone) includes image capture capability for capturing still images and video, as well as audio capture capability. In addition to enabling users to capture content for their own consumption, these capabilities enable users to generate media content for consumption by other persons. For instance, a variety of different online services are available for publishing user-generated media content for general consumption.

BRIEF DESCRIPTION OF THE DRAWINGS

Aspects of user image presentation based on region priority are described with reference to the following Figures. The same numbers may be used throughout to reference similar features and components that are shown in the Figures:

FIG. 13 illustrates an example method for processing primary content in accordance with one or more implementations;

DETAILED DESCRIPTION

Figure 1:
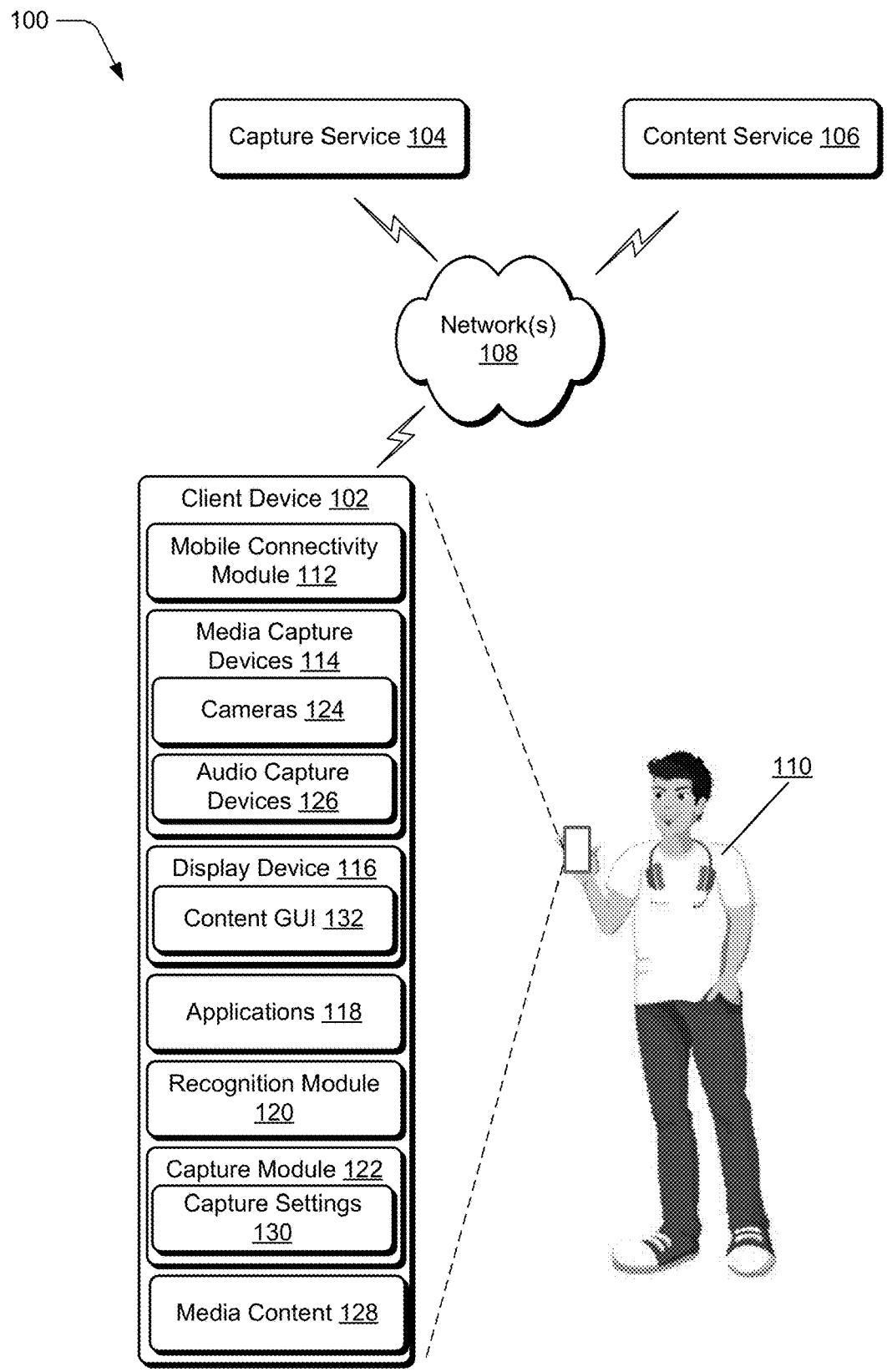
FIG. 1 illustrates an example environment in which aspects of user image presentation based on region priority can be implemented.

Techniques for user image presentation based on region priority are described and are implementable to enable different regions of visual content to be prioritized and for a user image to be inserted into lower priority regions to avoid obstruction of higher priority visual objects. Further, a user state of a user can be determined and used to control whether a user image is included in media content based on the user state. Accordingly, different visual region priorities and user states can be utilized to control inclusion of user images in media content.

According to various implementations, a user leverages a client device to capture media content. For instance, a client device (e.g., a smartphone) is in a content capture mode for generating the media content. In at least one implementation the content capture mode represents a video blogging mode for generating a video blog. Further, the client device includes multiple cameras for capturing visual scenes and objects from various perspectives of the client device. For instance, the client device includes a first camera that captures a visual scene from a first perspective (e.g., a rear facing camera) and a second camera that captures an image of a user, e.g., a front facing camera. Thus, a first video feed from the first camera and a second video feed from the second camera are available to generate an instance of video content. Alternatively or additionally, the first video feed represents application content generated by an application, such as an application executed and/or exposed via the client device.

Further to example implementations, to determine whether to include an image of a user in media content, a user state of the user is determined. For instance, various sensors are utilized to capture visual attributes of the user, such as physical features including facial features. Based on visual attributes of the user, for example, different facial gestures are identifiable to indicate different user states of the user. Generally, different user states are definable such as an engaged state (e.g., the user is talking), a disengaged state (e.g., the user is not talking), a body state (e.g., the user is sneezing or coughing), a consume state (e.g., the user is consuming a substance such as food and/or drink), etc.

In at least one implementation, when a user is determined to be in a disengaged state, media content is generated that includes a captured image of visual scene but does not include an image of the user. For instance, when a user is in a disengaged state, this indicates that the user is passive and thus the media content is focused on a visual scene such as scenery and/or live action occurring in a surrounding environment. When a user begins talking the user is detected to be in an engaged state and thus media content can be generated to include an image of the user. The image of the user, for example, is included along with the visual scene in the media content. Generally, this enables the image of the user to be presented when the user is providing comments regarding the visual scene and/or other speech content.

In at least one implementation some user states represent states in which inclusion of a user image in media content is to be at least temporarily paused. For example, consider a scenario in which a user is in an engaged state and a user image is being included in media content. The user is then detected in a body state, such as sneezing or about the sneeze, or coughing or about to cough. Alternatively or additionally, the user is detected in a consume state, such as drinking or eating. Accordingly, inclusion of the user image in media content can be paused to avoid showing the user sneezing or coughing, or eating or drinking, in the media content. When the user transitions from the body state and/or the consume state (e.g., returns to an engaged state), inclusion of the user image in media content can be resumed.

In at least one implementation media capture settings are configurable to specify user states in which a user image is to be included in media content and user states in which a user image is not to be included in media content. Generally, this provides for customizable media content generation tailored to specific user scenarios.

Further to implementations, to determine how to include a user image in media content, different portions of the media content are prioritized. For instance, high priority regions and low priority regions of media content are identified and/or tagged. High priority regions of media content, for example, represent regions of media content that include visual objects that are identified as high priority objects. For instance, in the context of application content, a high priority region can represent a region of media content in which interactive visual objects are presented. Consider, for example, a gaming application that includes game visual objects involved in gameplay such as avatars, game pieces, etc. Portions of media content that include interactive visual objects can be identified as high priority regions within the media content. Further, portions of the media content that do not include interactive visual objects (e.g., background and/or static visuals) can be identified as low priority regions. Accordingly, when presenting a user image within the media content (e.g., when the user image is in an "image on" state), the user image can be presented within a low priority region to avoid obstructing visual objects within a high priority region, e.g., high priority visual objects.

Accordingly, the techniques described herein provide for automated detection of visual region priority in media content to enable presentation of user images to avoid obstructing high priority visual objects. Further, user states can be automatically detected to enabler automated switching between inclusion of a user image in media content and exclusion of a user image in media content. These capabilities remove the need for a user to manually specify whether a user image is included in media content while the media content is being generated.

While features and concepts of user image presentation based on region priority can be implemented in any number of environments and/or configurations, aspects of user image presentation based on region priority are described in the context of the following example systems, devices, and methods.

FIG. 1 illustrates an example environment 100 in which aspects of user image presentation based on region priority can be implemented. The environment 100 includes a client device 102, a capture service 104, and a content service 106 that are interconnectable via network(s) 108. In this particular example, the client device 102 represents a portable device that can be carried by a user 110, such as a smartphone or a tablet device. These examples are not to be construed as limiting, however, and the client device 102 can be implemented in a variety of different ways and form factors such as a laptop computer, a desktop computer, and so forth. Example attributes of the client device 102 are discussed below with reference to the device 1800 of FIG. 18.

The client device 102 includes various functionality that enables the client device 102 to perform different aspects of user image presentation based on region priority discussed herein, including a mobile connectivity module 112, media capture devices 114, a display device 116, applications 118, a recognition module 120, and a content capture module ("capture module") 122. The mobile connectivity module 112 represents functionality (e.g., logic and hardware) for enabling the client device 102 to interconnect with other devices and/or networks, such as the network 108. The mobile connectivity module 112, for instance, enables wireless and/or wired connectivity of the client device 102.

The media capture devices 114 are representative of functionality to enable various types of media to be captured via the client device 102, such as visual media and audio media. In this particular example the media capture devices 114 include cameras 124 and audio capture devices 126. The media capture devices 114, however, can include a variety of other devices that are able to capture various types of media in accordance with the implementations discussed herein. According to implementations, the media capture devices 114 include not only hardware for capturing associated media but also logic (e.g., drivers, firmware, etc.) for operating and configuring operation of the associated media capture devices 114. The display device 116 represents functionality (e.g., hardware and logic) for enabling visual output via the client device 102. The applications 118 represent functionality for enabling different tasks to be performed via the client device 102, such as productivity tasks, entertainment tasks (e.g., gaming, media content consumption), web browsing, etc.

The recognition module 120 represents functionality for recognizing visual objects such as in visual content (e.g., digital video) captured by the cameras 124. In at least one implementation the recognition module 120 is operable to recognize human features such as facial features and other bodily features. Further, the recognition module 120 is operable to recognize human gestures such as facial gestures, hand gestures, finger gestures, and other human gestures. In at least one implementation the recognition module 120 includes and/or makes use of artificial intelligence (AI) algorithms to enable recognition of various human attributes such as human features and human gestures. While the recognition module 120 is depicted separately from the capture module 122, in at least one implementation the recognition module 120 represents functionality implemented by the capture module 122.

The capture module 122 represents functionality for performing various aspects of user image presentation based on region priority described herein. The capture module 122, for instance, enables content captured by the media capture devices 114 to be utilized to generate media content 128. Further, the capture module 122 enables the media content 128 to be generated based on capture settings that specify how the media content 128 is to be generated. For instance, and as further detailed below, the capture module 122 leverages the capture settings 130 to determine in which scenarios an image of the user 110 is to be included in media content 128 and in which scenarios the image of the user 110 is not to be included. Further, the capture module 122 is operable to leverage the capture settings 130 to cause various human gestures recognized by the recognition module 120 in video content captured by the cameras 124 to be excluded from or included in instances of the media content 128.

The capture module 122 also represents functionality for mapping various features of the media content 128 to determine ways in which to present an image of the user 110 relative to other portions of the media content 128. For instance, and as further detailed below, the capture module 122 can identify different visual elements and/or regions of the media content 128 and determine how and/or whether to present an image of the user 110 as part of the media content 128. In implementations, the capture settings 130 can specify ways in which an image of the user 110 is to be presented within the media content 128. The client device 102 also includes a content graphical user interface (GUI) 132 that is displayable by the display device 116 for displaying visual content captured by the cameras 124 as well as instances of the media content 128.

Further to the environment 100, the capture service 104 represents a network-based service that is accessible to the client device 102 (e.g., via the network 108) for assisting in content capture, content generation tasks, and content arrangement tasks. For example, the recognition module 120 leverages the capture service 104 to assist in performing visual object recognition tasks, such as for recognizing different user gestures. Further, the capture service 104 can enable arrangement of user images relative to media content, such as positioning of an image of the user 110 within the media content 128. In at least one implementation the capture service 104 provides AI services to the recognition module 120 for enabling different object recognition tasks.

The content service 106 represents a network-based service to which instances of the media content 128 are publishable such as to enable other users to access and consume instances of the media content 128.

Having discussed an example environment in which the disclosed techniques can be performed, consider now some example scenarios and implementation details for implementing the disclosed techniques.

FIGS. 2a-9 depict example aspects of user image presentation based on region priority in accordance with one or more implementations. While the aspects are described in the context of various functionality of the client device 102, it is to be appreciated that the aspects are implementable in a variety of different device scenarios not expressly described herein. Further, certain features of the client device 102 are omitted for purpose of discussion but are considered to be available for implementing the described aspects.

Figure 2A:
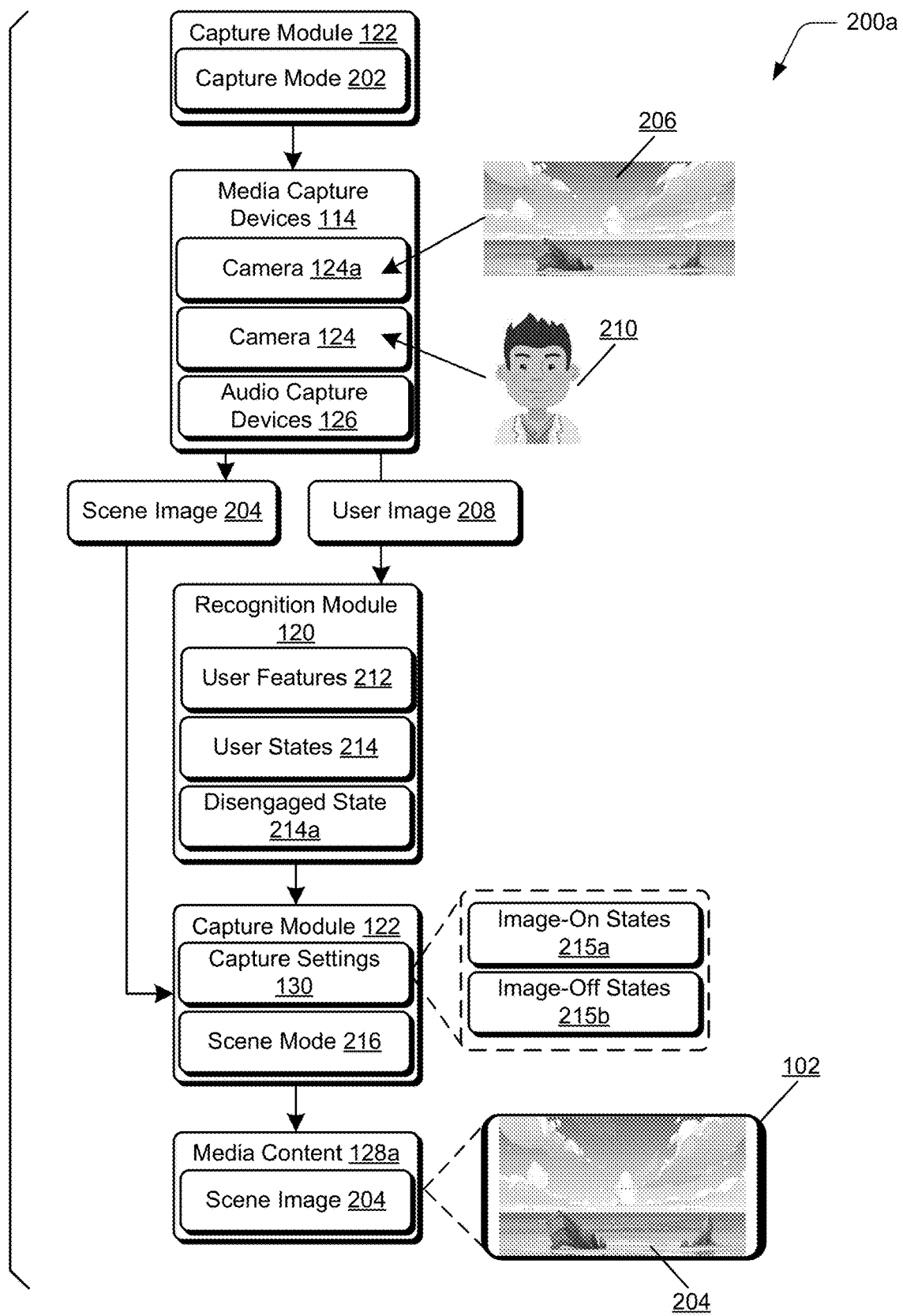
FIG. 2*a* depicts an example system for initiating a capture mode for generating media content in accordance with one or more implementations.

FIG. 2a depicts an example system 200a for initiating a capture mode for generating media content in accordance with one or more implementations. The system 200a can be implemented in the environment 100 and incorporates attributes of the environment 100 introduced above.

In the system 200a a capture mode 202 of the capture module 122 is activated. The capture mode 202, for instance, represents a mode in which the capture module 122 generates media content 128, such as for storage and subsequent consumption and/or for real-time consumption, e.g., a livestream. The capture mode 202, for example, is activated based on user input to activate the capture mode 202, e.g., input to the client device 102. In at least one implementation the capture mode 202 represents a video blogging mode and the media content 128 includes instances of video blogs generated while in the video blogging mode.

In conjunction with activation of the capture mode 202 a camera 124a captures a scene image 204 of scene 206 and a camera 124b captures a user image 208 of a user 210. Generally, the cameras 124a, 124b represent different instances of the cameras 124. In at least one implementation the cameras 124a, 124b are positioned at different respective positions relative to the client device 102. For instance, the camera 124a represents a rear-facing camera of the client device 102 and the camera 124b represents a front-facing camera of the client device 102. Accordingly, in this example, the scene 206 represents visual objects (e.g., scenery) in view of the camera 124a and the user 210 is in view of the camera 124b. In at least one implementation the camera 124b is operable in a low power mode where the user image 208 is captured but is not displayed on the display device 116.

Further to the system 200a the recognition module 120 processes the user image 208 to identify user features 212 of the user 210 indicated by the user image 208. The user features 212, for instance, represent physical features of the user 210 such as facial features including facial gestures as well as other physical features such as user pose, bodily gestures (e.g., hand gestures), and so forth. The recognition module 120 compares the user features 212 to user states 214 to determine that the user 210 is in a disengaged state 214a. Generally, the user states 214 include different predefined states that are usable by the capture module 122 to determine how to configure and/or present content for the media content 128. The user states 214, for instance, include state mappings that specify human gestures (e.g., facial gestures) that correlate to different user states. Different examples of the user states 214 are detailed below.

In this particular example the user features 212 indicate that the user 210 is in a disengaged state 214a, which represents an instance of the user states 214. The user features 212, for instance, indicate that the user 210 is in a passive state (e.g., not talking) and is thus in the disengaged state 214a. Accordingly, the capture module 122 determines based on the capture settings 130 whether the user image 208 is to be included in media content. The capture settings 130, for example, identify different image-on states 215a and image-off states 215b. Generally, the image-on states 215a specify different user states 214 in which a user image is to be included in media content, and the image-off states 215b specify different user states 214 in which a user image is not to be included in media content. In this particular example the disengaged state 214a is identified as an image-off state 215b.

Accordingly, since the user 210 is determined to be in the disengaged state 214a which represents an image-off state 215b, the capture module 122 determines that an instance of media content 128a is to be generated based on a scene mode 216 to not include the user image 208. The capture settings 130, for instance, map different user states 214 to different content modes that specify content type(s) to be included in media content and/or how content is to be visually arranged in media content. For example, at this particular point during generation of the media content 128a and based on the scene mode 216, the media content 128a includes the scene image 204 and does not include the user image 208. For instance, since the user 210 is determined to be in the disengaged state 214a (e.g., an image-off state 215b), the user image 208 is not included in the media content 128a.

Figure 2B:
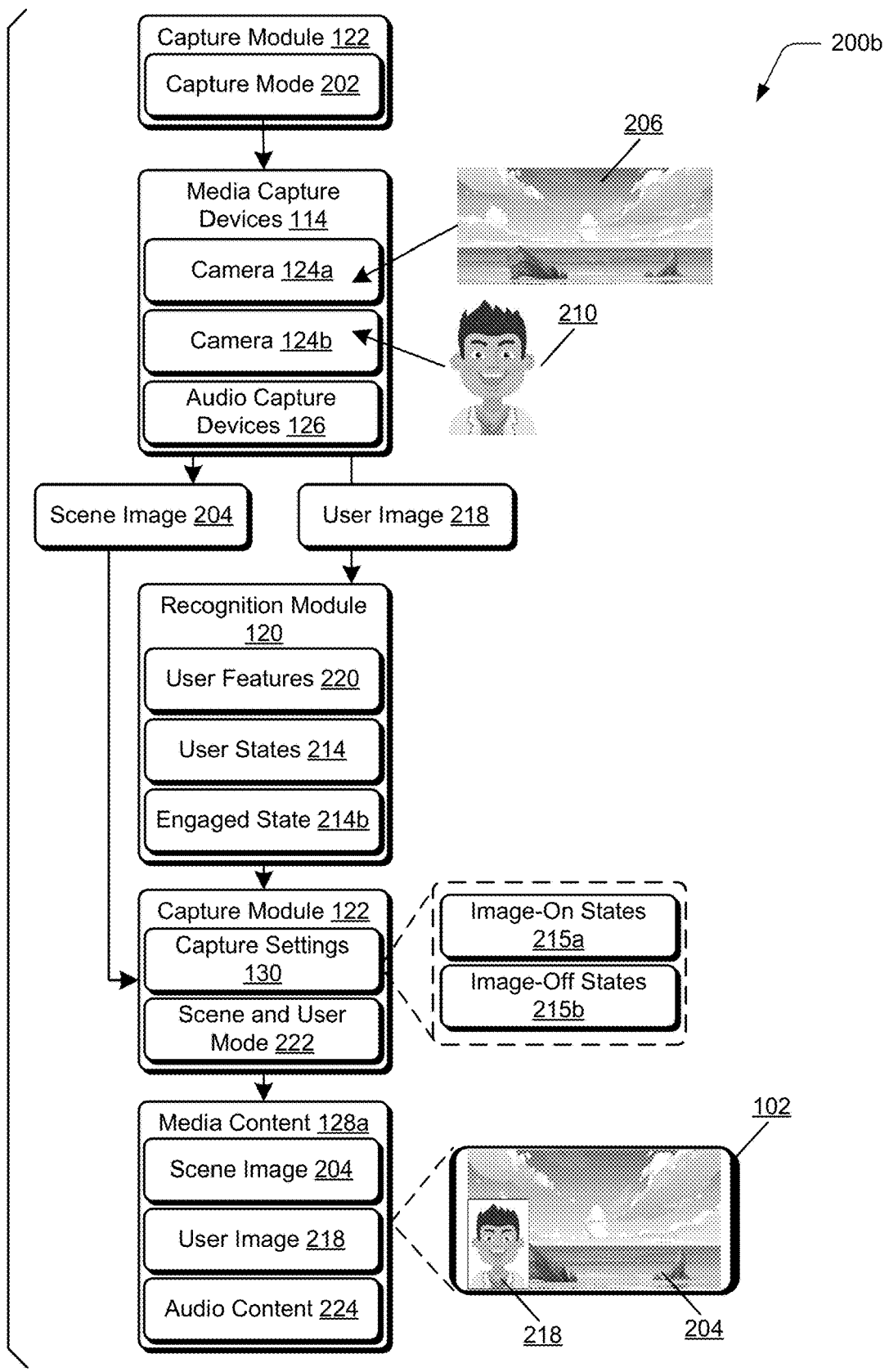
FIG. 2*b* depicts a system for generating media content based on a change in user state in accordance with one or more implementations.

FIG. 2b depicts a system 200b for generating media content based on a change in user state in accordance with one or more implementations. The system 200b, for instance, represents a continuation of the system 200a. In the system 200b the cameras 124a, 124b continue to capture images of the scene 206 and the user 210. For instance, a user image 218 of the user 210 is captured and the recognition module 120 processes the user image 218 to identify user features 220 from the user image 218. Further, the recognition module 120 compares the user features 220 to the user states 214 to determine that the user 210 is in an engaged state 214b. For instance, the user features 220 indicate that the user 210 is about to start talking and/or is currently talking, such as based on facial features, e.g., an open and/or moving mouth. Further, the capture settings 130 specify that the engaged state 214b is an image-on state 215a.

Accordingly, since the user 210 is determined to be in the engaged state 214b which represents an image-on state 215a, the capture module 122 determines that the instance of media content 128a is to be generated based on a scene and user mode 222 to include the scene image 204 and the user image 218. For instance, as part of continuing generation of the media content 128a, the user image 218 is included along with the scene image 204 as part of the media content 128a. The user image 218, for example, is superimposed as a live image of the user 210 over a portion of the scene image 204, e.g., as a picture-in-picture (PIP) display within the scene image 204. Accordingly, while the user 210 is detected as being in the engaged state 214b the media content 128a is generated based on the scene and user mode 222. Further, the media content 128a is generated to include audio content 224 captured by the audio capture devices 126. The audio content 224, for instance, includes speech content captured by the audio capture devices 126 from the user 210.

In at least one implementation if the user stops talking (e.g., for a threshold period of time) the capture module 122 detects a change to the disengaged state 214a and switches to the scene mode 216 where the scene image 204 is used to generate the media content 128a and the user image 218 is removed from display, such as described in the system 200a. Accordingly, the described techniques are implementable to dynamically detect changes in user state (e.g., engagement state) and to automatically and dynamically switch content generation modes based on the user state changes.

Figure 3:
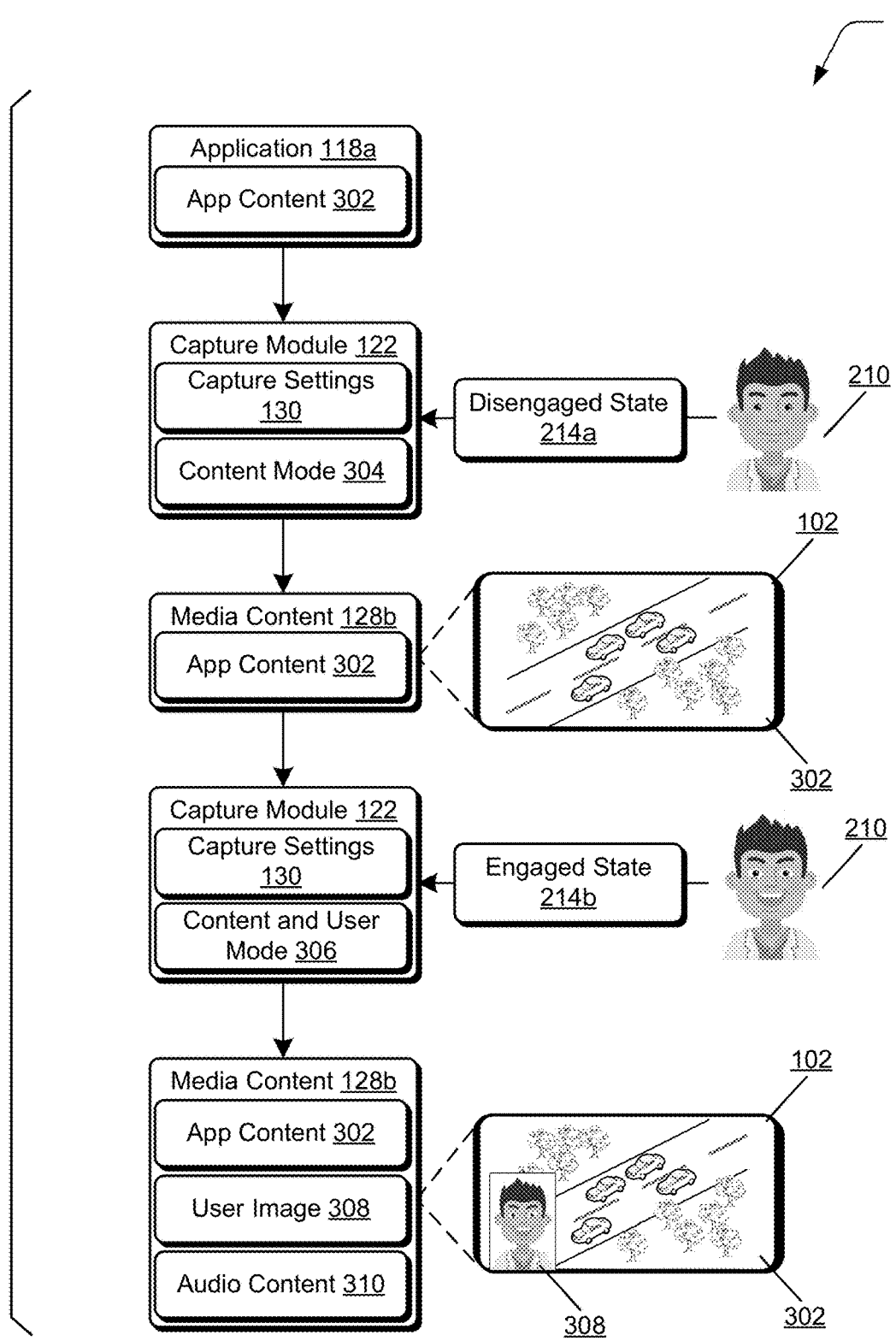
FIG. 3 depicts a system for generating media content utilizing application content in accordance with one or more implementations.

FIG. 3 depicts a system 300 for generating media content utilizing application content in accordance with one or more implementations. In the system 300 the capture module 122 is in the capture mode 202 (such as described above) and is generating an instance of media content 128b using application ("app") content 302 generated by an application 118a. The application 118a, for instance, represents an instance of the applications 118 executing and/or exposed via the client device 102. In at least one implementation the application 118a represents a gaming application and the app content 302 represents gaming content, e.g., a video game. The user 210, for example, is engaged in gameplay of the application 118a. Further, the user 210 is determined to be in the disengaged state 214a which in this particular example represents an image-off state 215b. Example ways for determining different user states (e.g., engaged, disengaged, etc.) are detailed above such as with reference to the systems 200a, 200b.

Accordingly, based on determining that the user 210 is in the disengaged state 214a, the capture module 122 determines based on the capture settings 130 that the instance of media content 128b is to be generated based on a content mode 304 to include the app content 302. For instance, at this particular point during generation of the media content 128b and based on the content mode 304, the media content 128b includes the app content 302 and does not include the user image 218, e.g., since the user 210 is determined to be in the disengaged state 214a.

Further to the system 300 the capture module 122 detects a change in user state of the user 210 from the disengaged state 214a to the engaged state 214b, which in this particular example is identified as an image-on state 215a. Ways for detecting a change in user state are described throughout, such as based on detecting a change in facial gestures of the user 210. Accordingly, based on detecting the engaged state 214b of the user 210, the capture module 122 determines based on the capture settings 130 that the instance of media content 128b is to be generated based on a content and user mode 306 to include the app content 302 and a user image 308. For instance, as part of continuing generation of the media content 128b, the user image 308 is included along with the app content 302 as part of the media content 128b. Further, the media content 128b is generated to include audio content 310 captured by the audio capture devices 126. In at least one implementation this enables the user image 308 of the user 210 to be presented and enables the user 210 to provide commentary regarding the app content 302. For instance, in a gaming scenario, the audio content 310 includes commentary on gameplay of the application 118a.

In implementations and in the context of the client device 102, using the app content 302 as part of generating the media content 128b enables multiple cameras 124 to be available for capturing visual content, such as the user image 308. For instance, in conjunction with capturing the app content 302 from the application 118a, the user image 308 can be captured by the camera 124a (e.g., a rear-facing camera of the client device 102) and/or the camera 124b, e.g., a front-facing camera of the client device 102. Other types of visual content additionally or alternatively to the user image 308 may be captured via the cameras 124 for inclusion as part of the media content 128b, such as other visual objects and/or visual scenes in proximity to the client device 102.

Further, the app content 302 may represent content displayed on the display device 116 of the client device 102 and/or content displayed on an external display device that is connected to the client device 102. For instance, the client device 102 can connect to a remote display device (e.g., via wireless and/or wired connectivity) and provide the app content 302 for display on the remote display device. Thus, the app content 302 can be presented in a variety of different ways in conjunction with generating the media content 128b, such as locally on the client device 102 and/or remotely on a connected external display device.

While the system 300 is discussed in the context of gaming content, a variety of other examples of app content 302 are contemplated, such as productivity content, social media content, web browsing content, etc. Further, the system 300 is implementable to dynamically respond to changes in user state. For instance, where the user 210 is detected as returning to the disengaged state 214a, the capture module 122 switches to generating the media content 128b based on the content mode 304.

Figure 4:
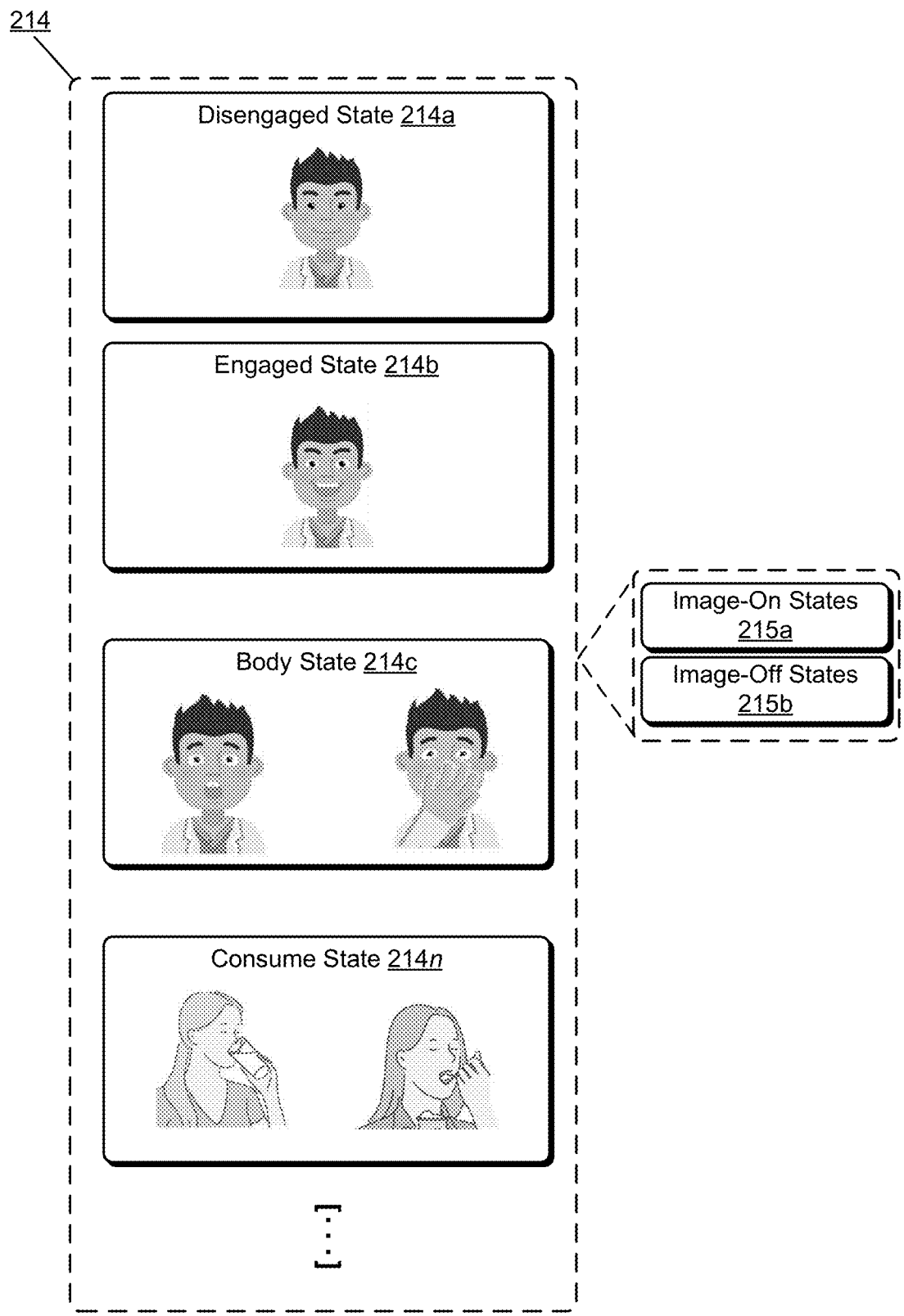
FIG. 4 depicts different examples of user states that are utilizable to control how media content is generated in accordance with one or more implementations.

FIG. 4 depicts different examples of user states 214 that are utilizable to control how media content is generated in accordance with one or more implementations. In implementations the user states 214 are detectable based on detecting various human features of a user, such as facial gestures, hand gestures, bodily gestures, and so forth. In a facial gesture scenario, for instance, the recognition module 120 detects various facial features and positions of the facial features to determine a user state 214. Examples of different facial features/positions include eyebrow position (e.g., normal, lowered, raised), eyelid position (e.g., open, open wide, lowered, closed), lip orientation (e.g., closed, open, open wide, in motion, smiling, frowning), etc. In at least one implementation detecting the user states 214 includes detecting visual objects in proximity to a user, which are usable to determine current and/or prospective activities of a user.

The user states 214 include the disengaged state 214a and the engaged state 214b, introduced above. The user states 214 also include a body state 214c and a consume state 214n. The body state 214c corresponds to different bodily functions of a user, such as sneezing and coughing. For instance, certain body states 214c are detectable based on corresponding facial and/or hand gestures. For instance, when a user is about to sneeze or cough the user may inhale deeply, raise their eyebrows, open their mouth wide, cover their mouth with their hand or their elbow, etc.

The consume state 214n corresponds to an indication that a user is about to consume a substance (e.g., food, drink, etc.) or is currently consuming a substance. Generally, detecting the consume state 214n can include detecting a user handling an eating utensil, handling a liquid vessel (e.g., a glass, a drink container, etc.), detecting a consumable substance in proximity to the user, etc.

According to various implementations the different user states 214 can be utilized to control how media content is generated. For instance, as described in the previous examples, different user states 214 are categorized as either image-on states 215a or image-off states 215b. Accordingly, whether a user image is included in media content is controllable based on whether the user is in an image-on state 215a or an image-off state 215b. In at least one example the body state 214c and the consume state 214n are identified as image-off states 215b such that inclusion of a user image with media content is paused or stopped in response to detecting a body state 214c or a consume state 214n.

For instance, consider a scenario in which a user is in an engaged state 214b which represents an image-on states 215a. Accordingly, the user's image is included in media content being generated. The recognition module 120 then detects a transition to a body state 214c or a consume state 214n, which are indicated in this example as image-off states 215b. In response the capture module 122 is operable to pause or stop inclusion of the user image in the media content, e.g., to avoid including a particular bodily function in the media content, and/or to avoid showing the user consuming a particular substance in the media content.

How media content capture is controlled based on different user states 214, however, is configurable. For instance, default settings of the capture module 122 specify that when a disengaged state 214a, a body state 214c, and/or a consume state 214n are detected, inclusion of a user image in media content is to be paused or stopped. Settings of the capture module 122, however, are able to be configured to change these settings such as to enable a user to specify in which user states a user image is to be included with media content. Consider, for example, the following implementation.

Figure 5:
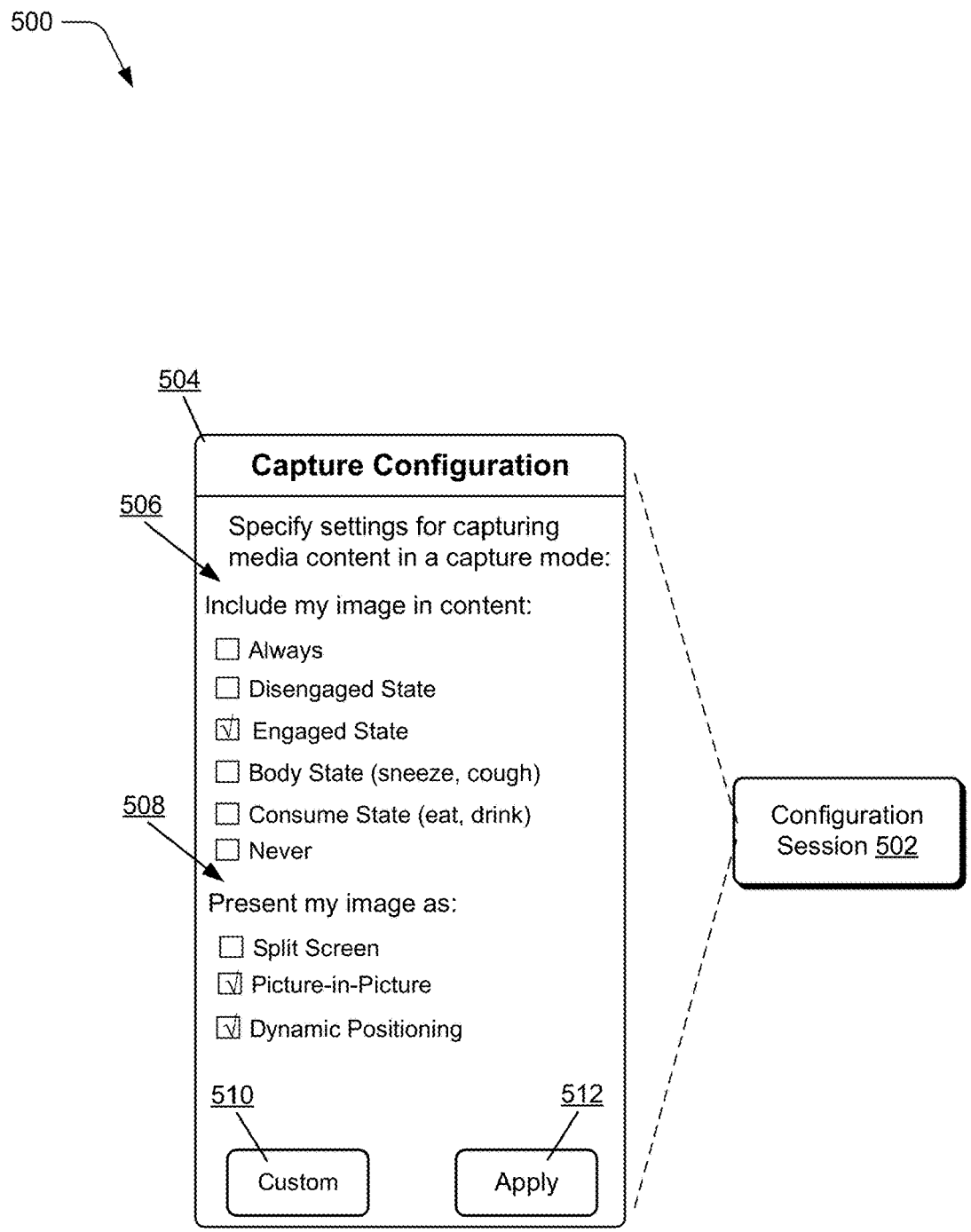
FIG. 5 depicts a scenario to configuring capture settings of a capture module.

FIG. 5 depicts a scenario 500 to configuring capture settings 130 of the capture module 122. In the scenario 500 a configuration session 502 is implemented to enable the capture settings 130 to be configured. A user, for instance, interacts with the client device 102 to cause the configuration session 502 to be invoked. As part of the configuration session 502 the capture module 122 causes a configuration graphical user interface (GUI) 504 to be presented, such as on the display device 116 of the client device 102. The configuration GUI 504 includes a state field 506 and an image configuration field 508. The state field 506 includes different selectable options for specifying when a user's image is to be included in media content. An "Always" option is selectable to cause the user's image to always be included in media content, e.g., when the capture mode 202 is active. A "Disengaged State" option is selectable to cause a user's image to be included in media content when the user is detected in a disengaged user state. In at least one example a default capture setting 130 specifies that the "Disengaged State" option is deselected such that by default a user's image is not included in media content when the user is detected in a disengaged state. A user, however, can select the "Disengaged State" option to override this default setting such that the user's image is included in media content when the user is detected in a disengaged state.

An "Engaged State" option is selectable to cause a user's image to be included in media content when the user is detected in an engaged state. In at least one example a default capture setting 130 specifies that the "Engaged State" option is selected such that by default a user's image is included in media content when the user is detected in an engaged state. A user, however, can deselect the "Engaged State" option to override this default setting such that the user's image is not included in media content when the user is detected in an engaged state.

A "Body State" option is selectable to cause a user's image to be included in media content when the user is detected as performing or about the perform a bodily function, such as sneezing or coughing. In at least one example a default capture setting 130 specifies that the "Body State" option is deselected such that by default a user's image is not included in media content when the user is detected in a body state. A user, however, can select the "Body State" option to override this default setting such that the user's image is included in media content when the user is detected in a body state.

A "Consume State" option is selectable to cause a user's image to be included in media content when the user is detected as being in a consume state, such as consuming or about to consume a substance, e.g., eating and/or drinking. In at least one example a default capture setting 130 specifies that the "Consume State" option is deselected such that by default a user's image is not included in media content when the user is detected in consume state. A user, however, can select the "Consume State" option to override this default setting such that the user's image is included in media content when the user is detected in a consume state. A "Never" option is selectable to cause the user's image to never be included in media content, e.g., when the capture mode 202 is active.

The image configuration field 508 includes different selectable image configuration options for specifying how a user's image is to be positioned in media content. A "Split Screen" option is selectable to cause a user's image to be presented in a split screen orientation. For instance, the user's image is presented on one half of a display region and captured scene content is presented on the other half. A "Picture-in-Picture" option is selectable to cause a user's image to be positioned in a PIP configuration, e.g., as a small image superimposed over a larger image of a captured scene. A "Dynamic Positioning" option is selectable to enable a user's image to be dynamically positioned, such as based on content types included in media content. For instance, when the Dynamic Positioning option is enabled, a user image is positioned based on attributes of media content into which the user image is inserted. The user image, for example, is inserted to minimize visual interference with high priority visual content. For instance, when the Dynamic Positioning option is enabled, a user image is presented to avoid overlap of the user image with high priority visual regions and/or high priority visual objects within visual content.

The configuration GUI 504 also includes a custom control 510 and an apply control 512. The custom control 510 enables a user to specify a custom visual configuration for presenting an image of the user in media content. For instance, as described in the following figure, a user is able to specify a custom position and size for an image of the user in media content. The apply control 512 is selectable to apply the various settings from the configuration GUI 504 to the capture settings 130.

Figure 6:
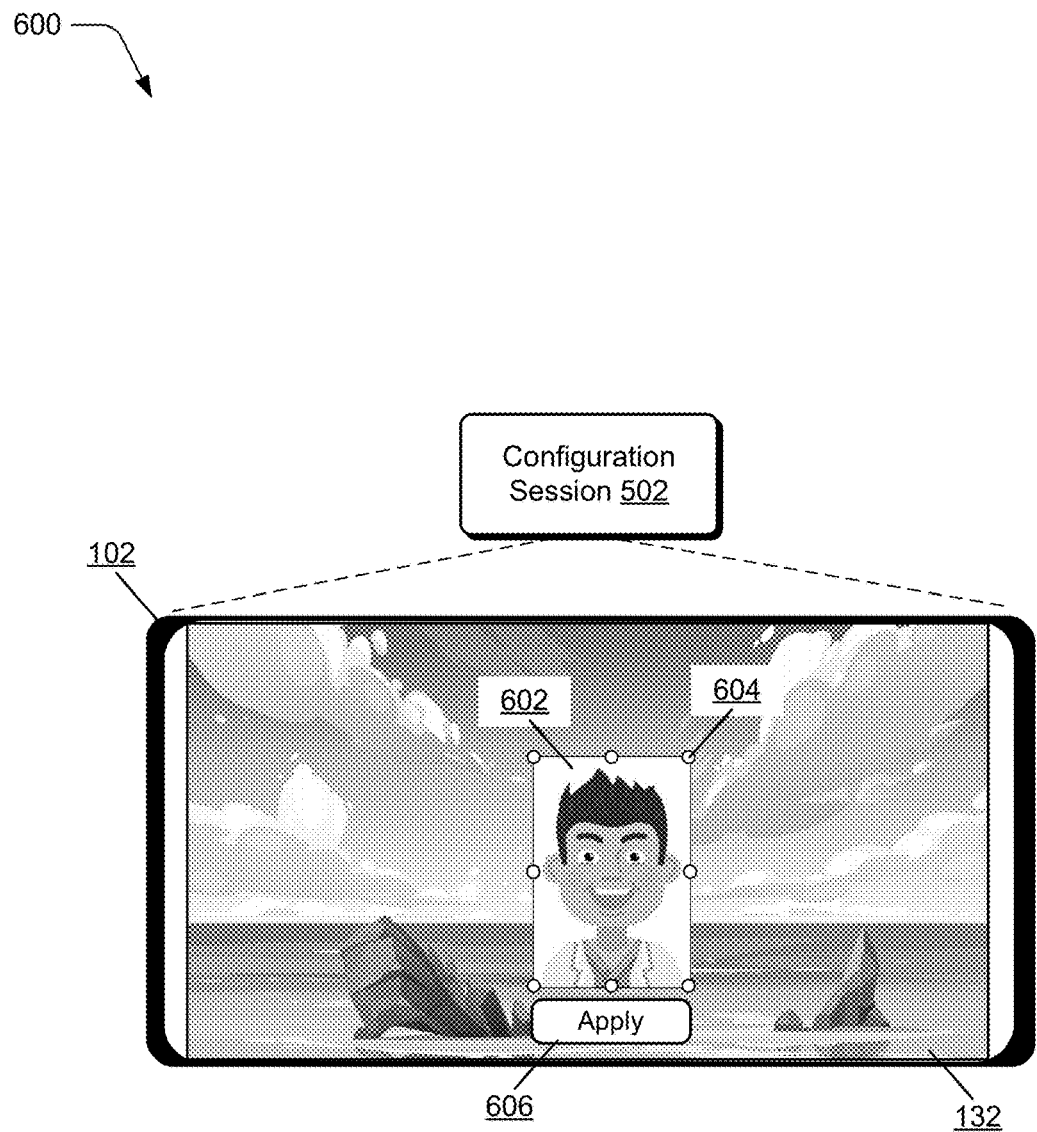
FIG. 6 depicts an example scenario for enabling a user to specify a custom position and/or size for a user image in accordance with one or more implementations.

FIG. 6 depicts an example scenario 600 for enabling a user to specify a custom position and/or size for a user image in accordance with one or more implementations. The scenario 600, for example, is implemented in response to selection of the custom control 510 from the configuration GUI 504 as part of the configuration session 502, introduced above.

In the scenario 600 a user image window 602 is displayed, e.g., via the capture module 122 as part of the configuration session 502. The content capture module 122, for instance, causes the user image window 602 to be displayed as part of the content GUI 132 on the display device 116 of the client device 102. Generally, the user image window 602 is configured to receive user input to reposition and/or resize the user image window 602. For instance, the user image window 602 is selectable to move the user image window 602 to different positions within the content GUI 132. Further, the user image window 602 includes different handles 604 that are selectable to resize the user image window. For example, the handles 604 are configured to receive user input to cause the user image window 602 to be resized larger and/or smaller, such as vertically and/or horizontally. Thus, via interaction with the user image window 602 a user can specify a size and position for presenting an image of the user in scenarios where the user image is presented such as part of generating an instance of media content.

Further to the scenario 600 an apply control 606 is presented that is selectable to generate position and size information based on user interaction with the user image window 602 and saved as part of the capture settings 130. For example, in conjunction with repositioning and/or resizing the user image window 602 a user selects the apply control 606. Accordingly, when an image of the user is subsequently presented as part of generating media content, the image of the user is presented according to the position and/or size specified by the user via interaction with the user image window 602.

Figure 7:
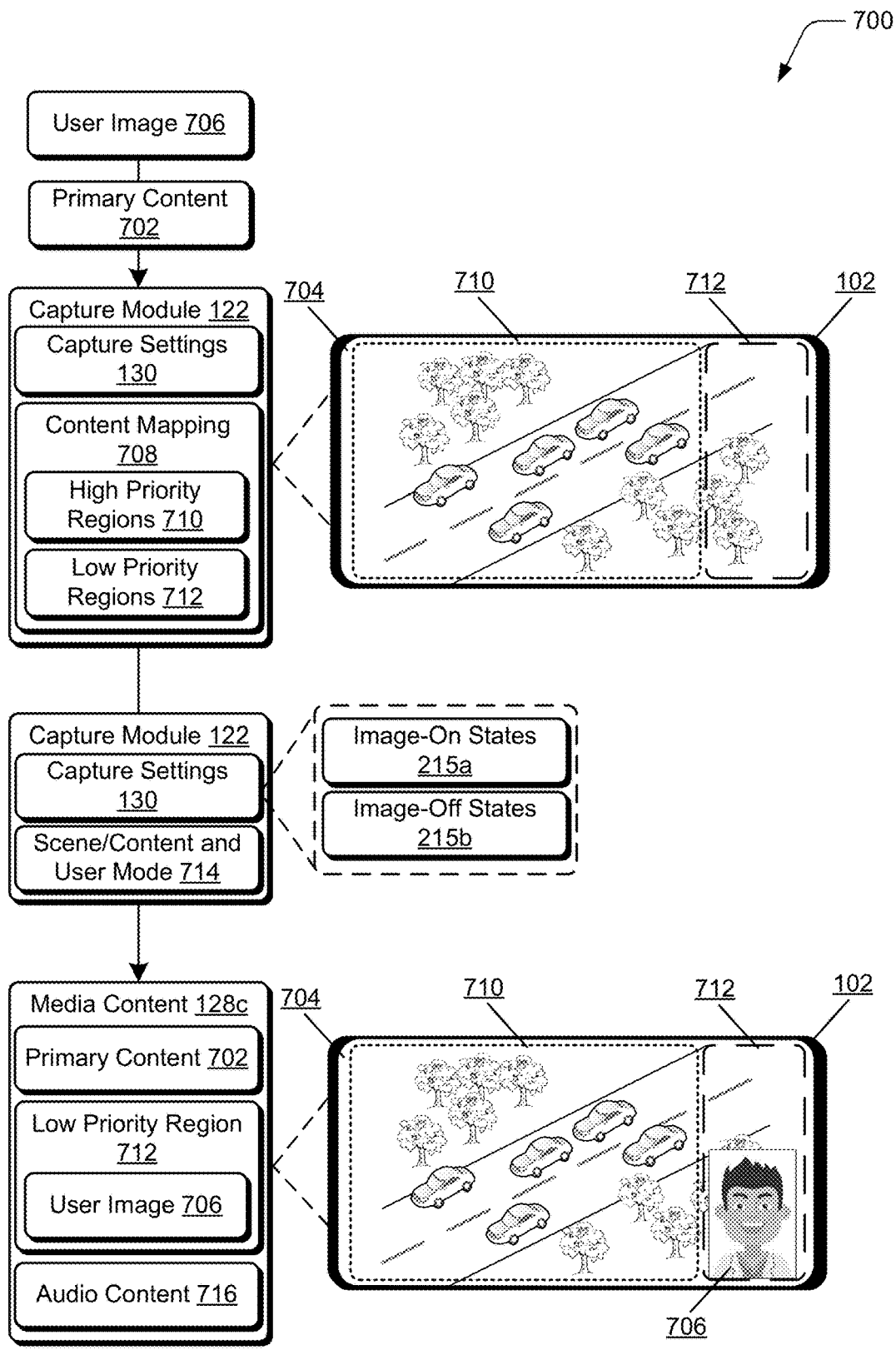
FIG. 7 depicts an example system for user image presentation based on region priority in accordance with one or more implementations.

FIG. 7 depicts an example system 700 for user image presentation based on region priority in accordance with one or more implementations. The system 700, for example, can be implemented in conjunction with the scenarios described above, such as to determine how to present a user image as part of media content. Further, the system 700 can be implemented in the environment 100 and incorporates attributes of the environment 100 introduced above.

In the system 700 the capture module 122 receives primary content 702 generated in conjunction with the client device 102. The primary content 702 can represent various types of content, such as a scene image captured via a camera 124, app content captured via an application 118, and so forth. In this particular example the primary content 702 includes application content 704, such as game content generated by a video game application and displayed on the client device 102. The capture module 122 also receives a user image 706 such as captured by a camera 124.

To determine whether and/or how to display the user image 706 in conjunction with display of the primary content 702, the capture module 122 performs content mapping 708 of the primary content 702. In at least one implementation, the capture settings 130 specify ways in which the content mapping 708 is to be performed, such as based on a content type of the primary content 702 and positions of visual objects within the primary content 702.

In this particular example the content mapping 708 identifies (e.g., flags) high priority regions 710 and low priority regions 712 within the primary content 702. The high priority regions 710, for instance, include high priority content. In the context of a video game, for example, the high priority regions 710 include content that is actively involved in gameplay of the video game, such as avatars and/or other game-related objects involved in gameplay. The low priority regions 712 represent portions of the primary content 702 that are lower priority than the high priority regions 710. In the context of a video game, for instance, the low priority regions 712 may include content that is not actively involved in gameplay, such as static and/or background visuals.

Further to the system 700 the capture module 122 determines that an instance of media content 128c is to be generated that includes the primary content 702 and the user image 706. For instance, and as detailed above, the capture module 122 determines that the user image 706 represents an image-on state 215a and thus a scene/content and user mode 714 is active such that the user image 706 is to be displayed along with the primary content 702 as part of the media content 128c. Further, and based at least in part on the capture settings 130 and the content mapping 708, the media content 128c is generated by inserting the user image 706 into a low priority region 712. By inserting the user image 706 in the low priority region 712, for example, visual obstruction of visual content in the high priority region 710 is avoided, such as to avoid obstruction of active game content being presented as part of gameplay associated with the primary content 702. The media content 128 can also include audio content 716 such as based on voice output provided by a user represented and/or captured via the user image 706.

Figure 8:
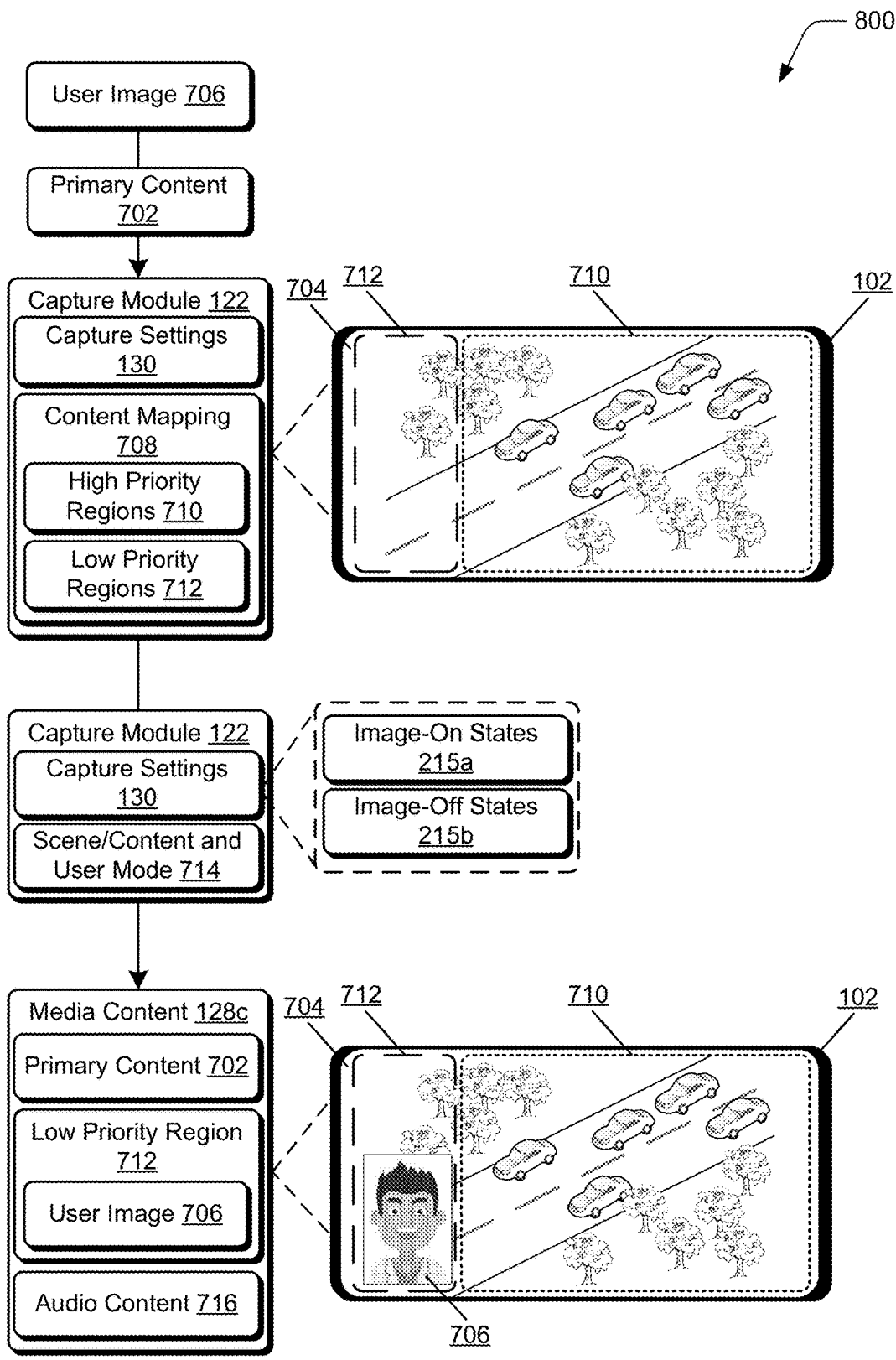
FIG. 8 depicts an example system for user image presentation based on region priority in accordance with one or more implementations.

FIG. 8 depicts an example system 800 for user image presentation based on region priority in accordance with one or more implementations. The 800, for example, represents an extensions and/or continuation of the system 700. Further, the system 800 can be implemented in the environment 100 and incorporates attributes of the environment 100 introduced above.

In the system 800 the capture module 122 continues to perform the content mapping 708 of the primary content 702, such as described above. For instance, the capture module 122 identifies the high priority regions 710 and the low priority regions 712 of the primary content 702. In this particular example the content mapping 708 indicates a reconfiguration of the high priority region 710 and the low priority region 712, such as based on a change in position of visual content within the primary content 702. For example, the capture module 122 performs the content mapping 708 dynamically and can adjust positions of the high priority regions 710 and the low priority regions 712 within the primary content 702 such as based on changes in position of visual objects within the primary content 702. In the context of a gameplay implementation, for example, changes in position of active visual objects involved in the gameplay can cause changes in position of the high priority regions 710 and the low priority regions 712. Accordingly, and based on the scene/content and user mode 714 being active, the user image 706 is repositioned to be displayed within the modified position of the low priority region 712. Thus, the described techniques can perform dynamic mapping of different content regions and can reposition user images to adapt to changes in position of content regions, e.g., changes in position of high priority regions and low priority regions.

In implementations a timer can be utilized to determine whether and/or how to reposition a user image in response to a change in region mapping. For instance, in a scenario where a position of a high priority region 710 and/or low priority region 712 changes to a new position within visual content, the capture module 122 can start a timer. If the position of the high priority region 710 and/or the low priority region 712 remains at the new position after expiry of the timer, the user image 706 can be repositioned to the new position of a low priority region 712. However, if a position of the high priority region 710 and/or the low priority region 712 changes before expiry of the timer, the user image 706 may not be repositioned (e.g., may remain in a previous position) and the timer may be restarted. Thus, a position of a user image within content can remain static and/or semi-static within content until expiry of the timer. In implementations this can avoid excessive user image repositioning based on rapid changes in high priority regions 710 and/or low priority regions 712, which can avoid presenting a jarring and/or confusing user experience.

Figure 9:
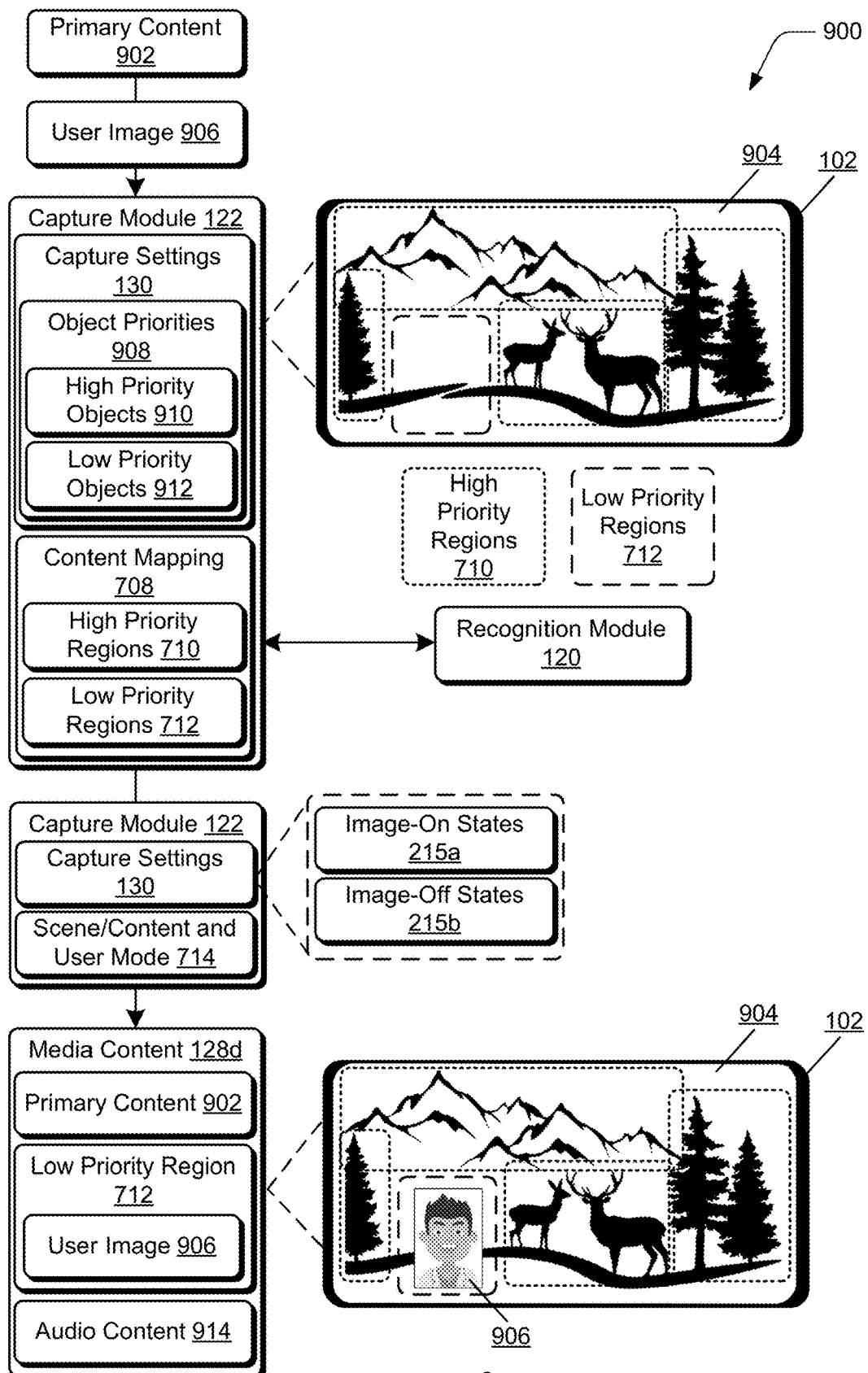
FIG. 9 depicts an example system for user image presentation based on region priority in accordance with one or more implementations.

FIG. 9 depicts an example system 900 for user image presentation based on region priority in accordance with one or more implementations. The system 900, for example, can be implemented in conjunction with the scenarios described above, such as to determine how to present a user image as part of media content. Further, the system 900 can be implemented in the environment 100 and incorporates attributes of the environment 100 introduced above.

In the system 900 the capture module 122 receives primary content 902 generated in conjunction with the client device 102. The primary content 902 can represent various types of content, such as a scene image captured via a camera 124, app content captured via an application 118, and so forth. In this particular example the primary content 902 includes a scene image 904 captured by a camera 124 and displayed on the client device 102. The scene image 904, for example, represents a captured image of a real world scene, such as an outdoor scene adjacent the client device 102. The capture module 122 also receives a user image 906 such as captured by a camera 124, e.g., a different camera 124 than utilized to capture the scene image 904.

To determine whether and/or how to display the user image 906 in conjunction with display of the primary content 902, the capture module 122 performs content mapping 708 of the primary content 902. In at least one implementation, the capture settings 130 specify ways in which the content mapping 708 is to be performed, such as based on a content type of the primary content 902 and positions of visual objects within the primary content 902.

In this particular example the content mapping 708 is based at least in part on object priorities 908 for different visual objects. The object priorities 908, for instance, identify high priority objects 910 and low priority objects 912. In implementations the object priorities 908 can be based on visual object types. For instance, certain visual objects may be indicated as objects of higher interest and thus identified as high priority objects 910, whereas other objects may be indicated as visual objects of lower interest and thus identified as low priority objects 912. In at least one implementation if a visual object is not identified as a high priority object 910 the visual object can be identified (e.g., by default) as a low priority object 912.

In implementations the object priorities 908 can include default object priorities, such as based on different predefined visual object types that are specified as high priority objects 910 and low priority objects 912. Further, the object priorities 908 can be user configurable. For instance, a user can interact with client device 102 to configure the capture settings 130 and identify different object priorities 908, e.g., different high priority objects 910 and low priority objects 912.

Accordingly, and based at least in part on the object priorities 908, the capture module 122 performs the content mapping 708 to identify high priority regions 710 that include high priority objects 910 and low priority regions 712 that include low priority objects 912. The capture module 122, for instance, leverages and/or interacts with the recognition module 120 to identify visual object types for visual objects recognized within the scene image 904. Based at least in part on the recognized visual object types the capture module 122 categorizes the different visual objects within the scene image 904 as either high priority objects 910 or low priority objects 912.

In this particular example the high priority objects 910 can include visual objects such as "animals," "mountains," "trees," etc. Thus, high priority regions 710 can be generated to include these high priority objects 910. Further, the low priority objects 912 can include visual objects not identified as a high priority object 910 (e.g., "open space," "open ground," etc.) and thus low priority regions 712 can be generated to encompass low priority objects 912.

Further to the system 900 the capture module 122 determines that an instance of media content 128d is to be generated that includes the primary content 902 and the user image 906. For instance, and as detailed above, the capture module 122 determines that the user image 906 represents an image-on state 215a and thus a scene/content and user mode 714 is active such that the user image 906 is to be displayed along with the primary content 902 as part of the media content 128d. Further, and based at least in part on the capture settings 130, the object priorities 908, and the content mapping 708, the media content 128d is generated by inserting the user image 906 into a low priority region 712.

By inserting the user image 906 in the low priority region 712, for example, visual obstruction of high priority objects 910 within the high priority regions 710 is avoided, such as to avoid visual obstruction high priority visual objects present within with the primary content 902. The media content 128 can also include audio content 914 such as based on voice output provided by a user represented and/or captured via the user image 906. For instance, as the user traverses a physical location represented by the scene image 904, the user can provide voice input narrating aspects of the scene image 904 which can be output as the audio content 914.

In implementations positions of the high priority objects 910 and the lower priority objects 912 can dynamically change, such as based on user movement and/or visual object movement within the scene image 904. Thus, the content mapping 708 can be dynamically performed to track positions of visual objects within the scene image 904. When a position of a high priority object 910 and/or a low priority object 912 changes, a position of a high priority region 710 and/or a low priority region 712 can be dynamically changed. Further, in response to a change in a position of a low priority region 712, a position of the user image 906 can be changed to be positioned within the low priority region 712. As described above, a timer may be implemented to determine when and/or whether to reposition the user image 906.

In implementations a size of the user image 906 can be adapted to fit within a low priority region 712, e.g., reduced and/or modified to avoid overlap with a high priority object 910 and/or a high priority region 710.

Figure 10:
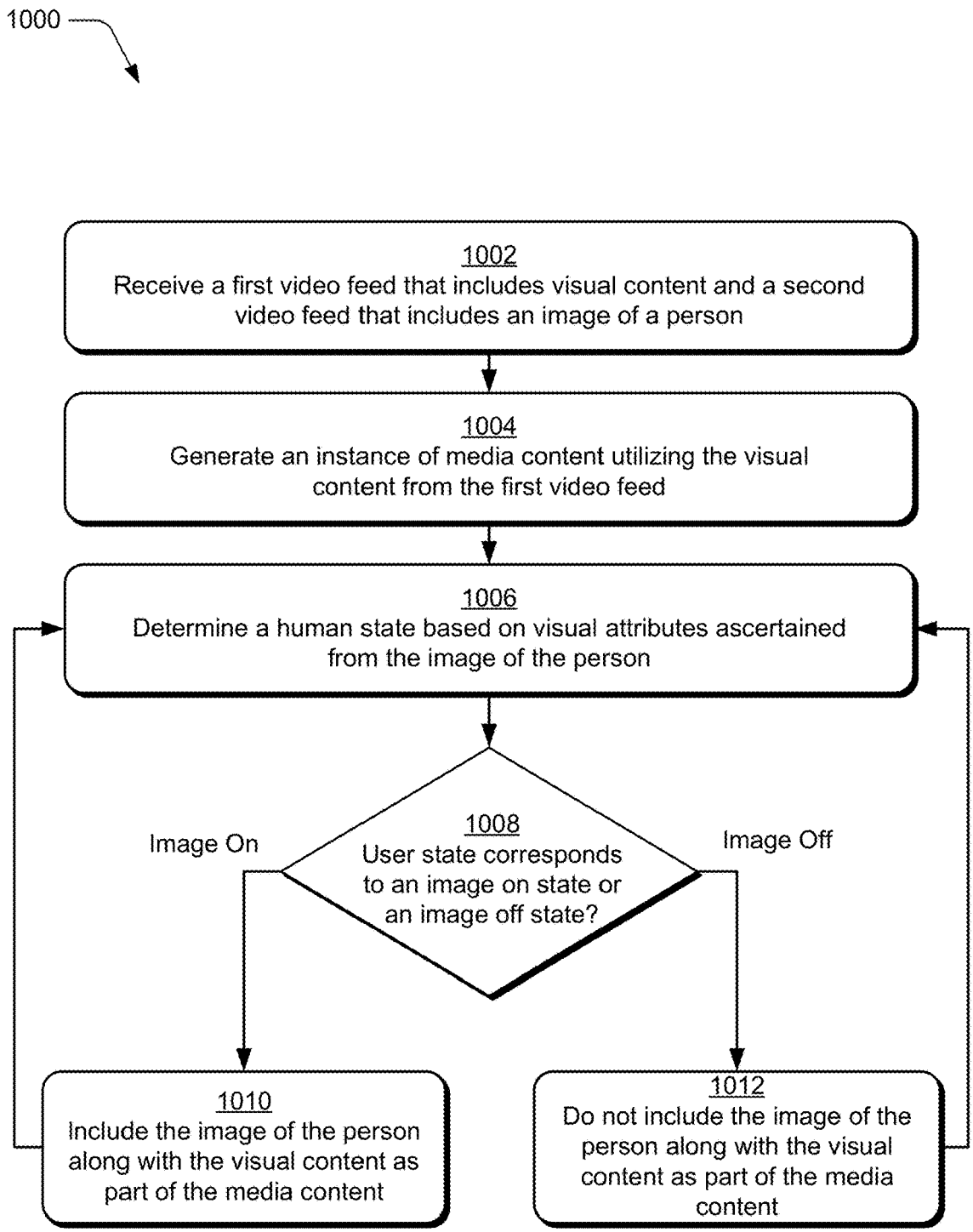
FIG. 10 illustrates an example method for user image presentation based on region priority in accordance with one or more implementations.

FIG. 10 illustrates an example method 1000 for user image presentation based on region priority in accordance with one or more implementations. At 1002 a first video feed that includes visual content and a second video feed that includes an image of a user are received. For instance, with reference to the client device 102, the camera 124a captures an image scene of an environment in proximity to the client device 102 and generates the first video feed. Alternatively or additionally the visual content represents content generated by an application 118. Further, the camera 124b captures an image of a user (e.g., a user in possession of the client device 102) to generate the second video feed.

At 1004, an instance of media content utilizing the visual content from the first video feed is generated. The capture module 122, for instance, generates an instance of video content utilizing the visual content captured via the first video feed. At 1006 a user state is determined based on visual attributes ascertained from the image of the user. For instance, the visual attributes include detected facial gestures of a user, and the user state is determined based on the facial gestures. In at least one implementation the user state is determined by correlating the facial gestures to state mappings specified by the user states 214. Different examples of user states are discussed above and include image-on states (e.g., an engaged state) and image-off states, e.g., a disengaged state, a body state, a consume state, etc.

At 1008 it is determined whether the user state corresponds to an image-on state or an image-off state. Different examples of image-on states and image-off states are described above. If the user state corresponds to an image-on state ("Image On"), at 1010 the image of the user is included along with the visual content as part of the media content. The capture module 122, for instance, includes a user image with visual content being generated. If the user state corresponds to an image-off state ("Image Off"), at 1012 the image of the user is not included as part of the visual content. The capture module 122, for example, does not include a user image as part of the visual content. Generally, the method is performable in real time to respond automatically and dynamically to changes in user state. For instance, the method returns to 1008 to monitor user state and is able to dynamically respond to changes in user state, such as to detect changes in visual attributes of a user that indicate changes between an image-on state and an image-off state.

Figure 11:
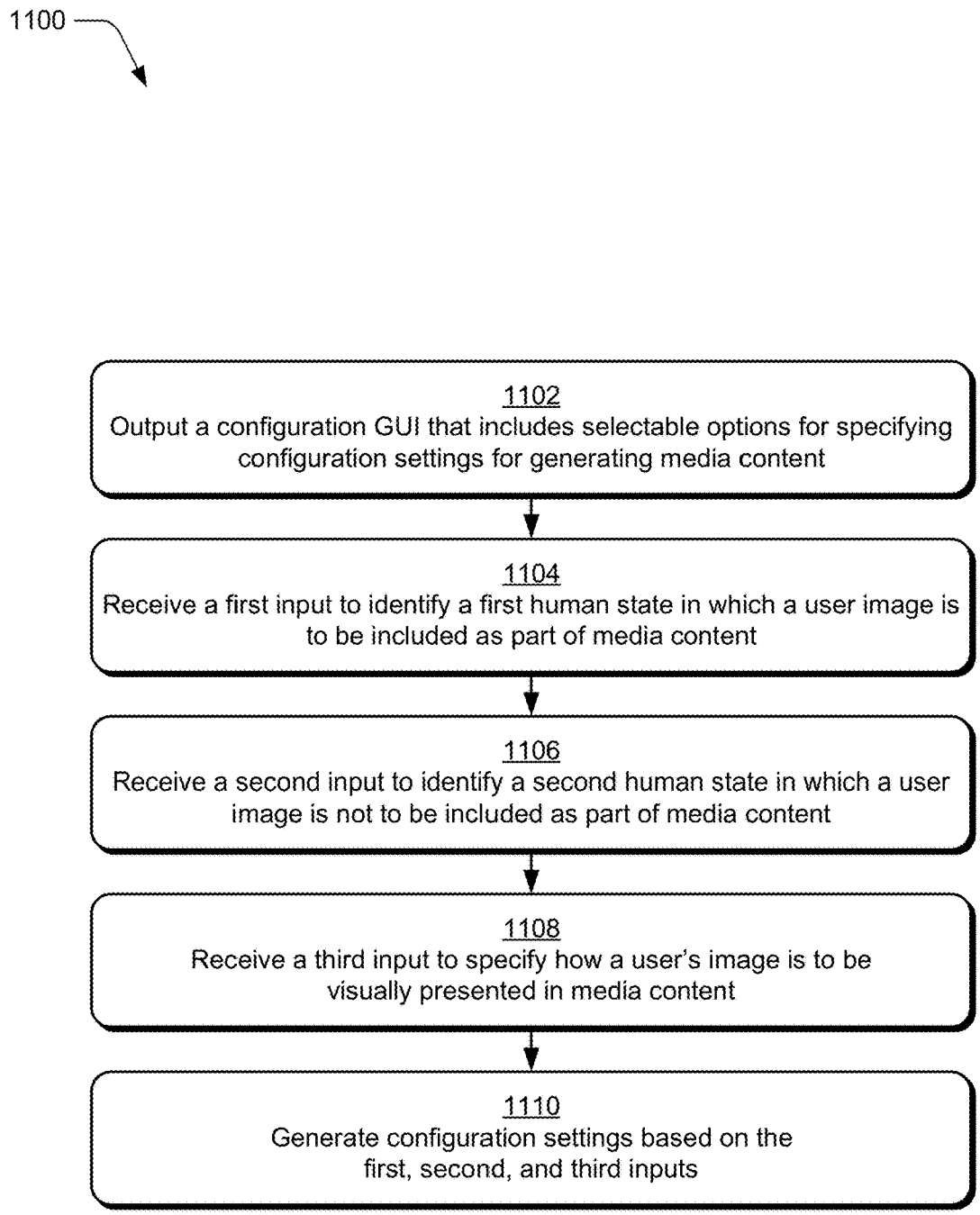
FIG. 11 illustrates an example method for configuring settings for user image presentation based on region priority in accordance with one or more implementations.

FIG. 11 illustrates an example method 1100 for configuring settings for user image presentation based on region priority in accordance with one or more implementations. The method 1100, for instance, represents an example way for implementing the configuration session 502. At 1102, a configuration GUI is output that includes selectable options for specifying configuration settings for generating media content. The configuration settings, for instance, include settings for image-on states, image-off states, settings for specifying how a user's image is to be sized and/or positioned in media content, and so forth. The capture module 122, for example, generates the configuration GUI 504 and causes the configuration GUI 504 to be output via the display device 116 of the client device 102.

At 1104, a first input is received to identify a first user state in which a user image is to be included as part of media content. The capture module 122, for example receives user input to select a user state in which a user image is to be included in media content, e.g., an image-on state 215a. At 1106, a second input is received to identify a second user state in which a user image is not to be included as part of media content. The capture module 122, for example receives user input to select a user state in which a user image is not to be included in media content, e.g., an image-off state 215b.

At 1108, a third input is received to specify how a user's image is to be visually presented in media content. The capture module 122, for example receives user input to specify how a user's image is to be sized and/or positioned in media content. At 1110, configuration settings are generated based on the first, second, and third inputs. The capture module 122, for example, generates the capture settings 130 and controls media content generation based on the capture settings 130, such as to control in which user states a user image is included or not included in media content, and/or to control how a user image is visually presented in media content.

Figure 12:
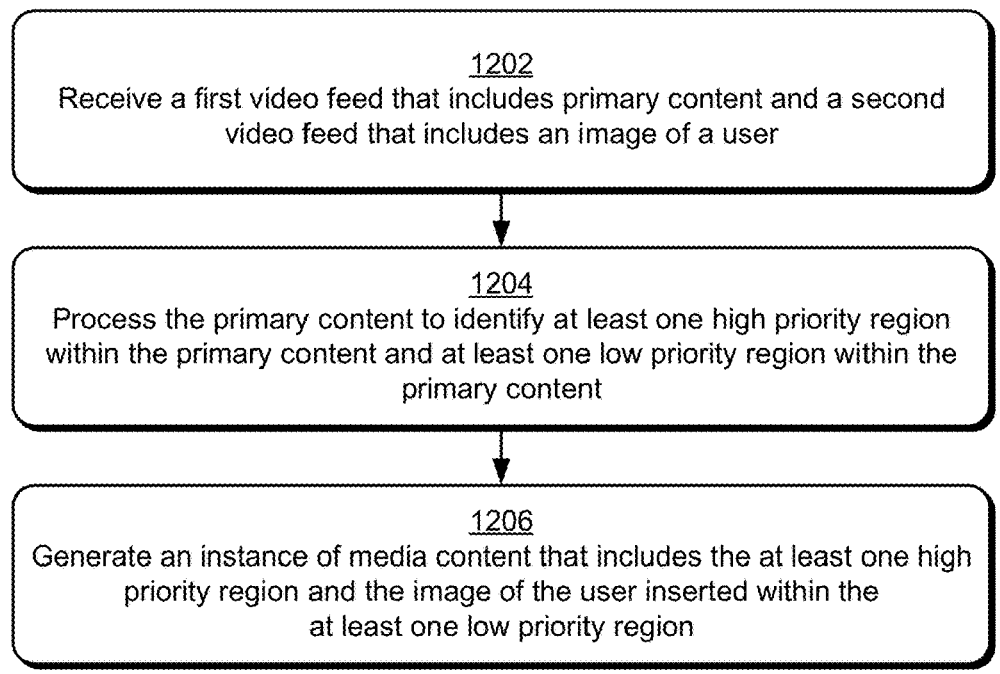
FIG. 12 illustrates an example method for inserting a user image into visual content in accordance with one or more implementations.

FIG. 12 illustrates an example method 1200 for inserting a user image into visual content in accordance with one or more implementations. At 1202 a first video feed is received that includes primary content and a second video feed is received that includes an image of a user. At 1204 the primary content is processed to identify at least one high priority region within the primary content and at least one low priority region within the primary content. At 1206 an instance of media content is generated that includes the at least one high priority region and the image of the user inserted within the at least one low priority region.

FIG. 13 illustrates an example method 1300 for processing primary content in accordance with one or more implementations. At 1302 one or more active visual objects within the primary content are identified. At 1304 the at least one high priority region is identified to include the one or more active visual objects.

Figure 14:
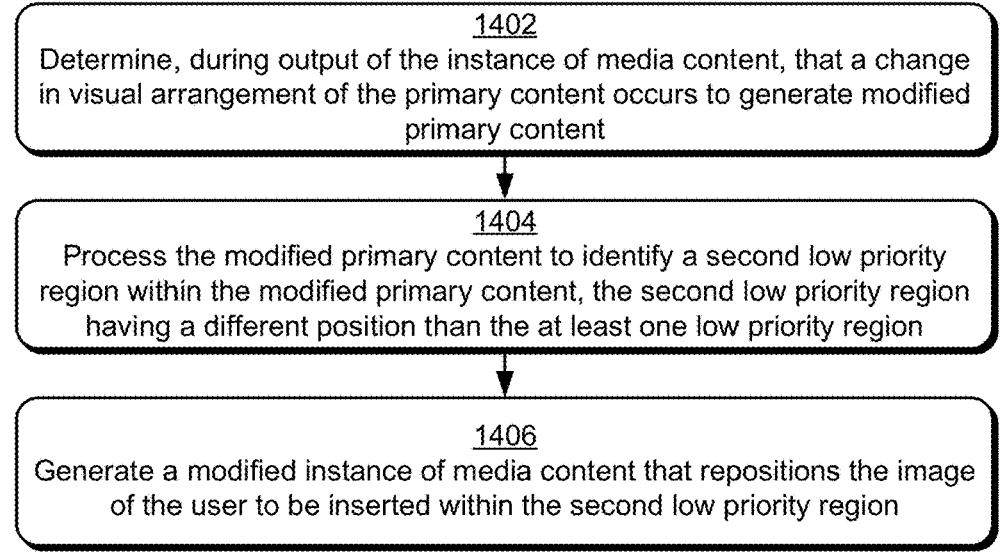
FIG. 14 illustrates an example method for dynamically modifying presentation of a user image within visual content in accordance with one or more implementations.

FIG. 14 illustrates an example method 1400 for dynamically modifying presentation of a user image within visual content in accordance with one or more implementations. At 1402, during output of the instance of media content, a determination is made that a change in visual arrangement of the primary content occurs to generate modified primary content. At 1404 the modified primary content is processed to identify a second low priority region within the modified primary content, the second low priority region having a different position than the at least one low priority region. At 1406 a modified instance of media content is generated that repositions the image of the user to be inserted within the second low priority region.

Figure 15:
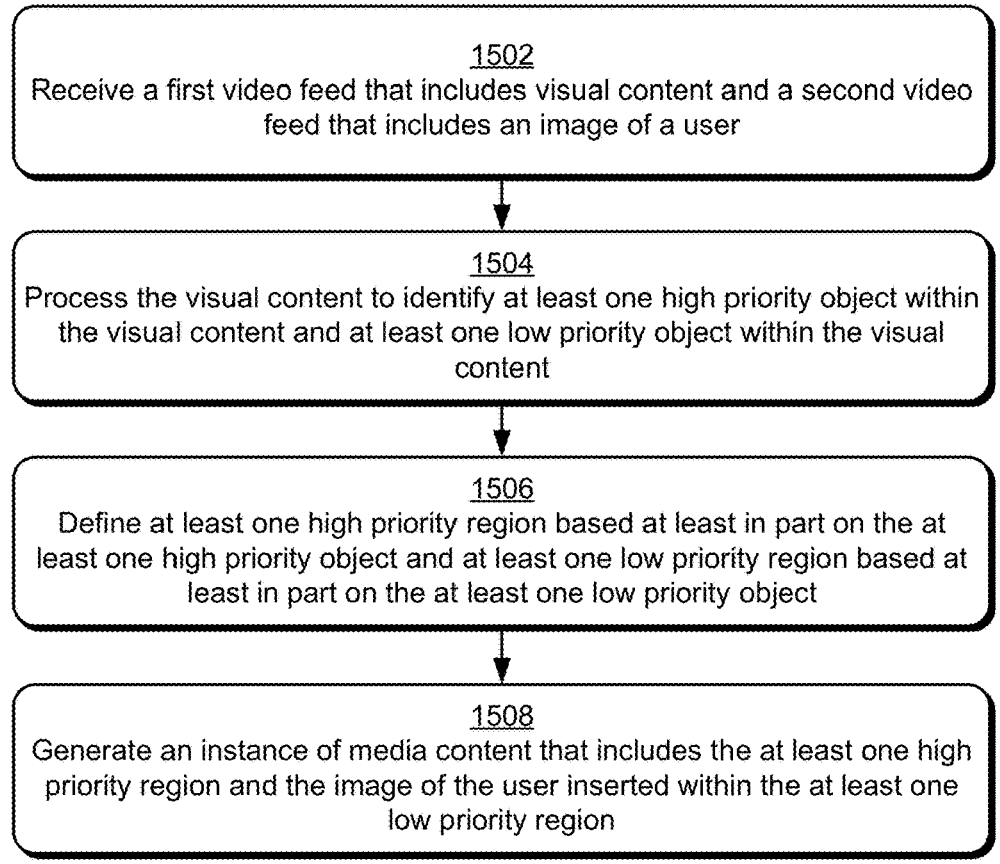
FIG. 15 illustrates an example method for positioning a user image based on visual object priority in accordance with one or more implementations.

FIG. 15 illustrates an example method 1500 for positioning a user image based on visual object priority in accordance with one or more implementations. At 1502 a first video feed that includes visual content and a second video feed that includes an image of a user are received. At 1504 the visual content is processed to identify at least one high priority object within the visual content and at least one low priority object within the visual content. At 1506 at least one high priority region is defined based at least in part on the at least one high priority object and at least one low priority region is defined based at least in part on the at least one low priority object. At 1508 an instance of media content is generated that includes the at least one high priority region and the image of the user inserted within the at least one low priority region.

Figure 16:
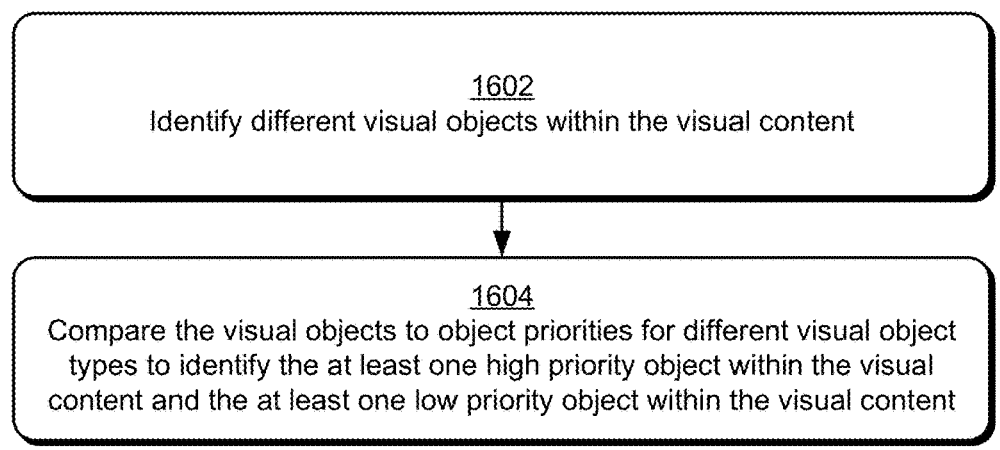
FIG. 16 illustrates an example method for determining visual object priority in accordance with one or more implementations.

FIG. 16 illustrates an example method 1600 for determining visual object priority in accordance with one or more implementations. At 1602 different visual objects are identified within the visual content. At 1604 the visual objects are compared to object priorities for different visual object types to identify the at least one high priority object within the visual content and the at least one low priority object within the visual content.

Figure 17:
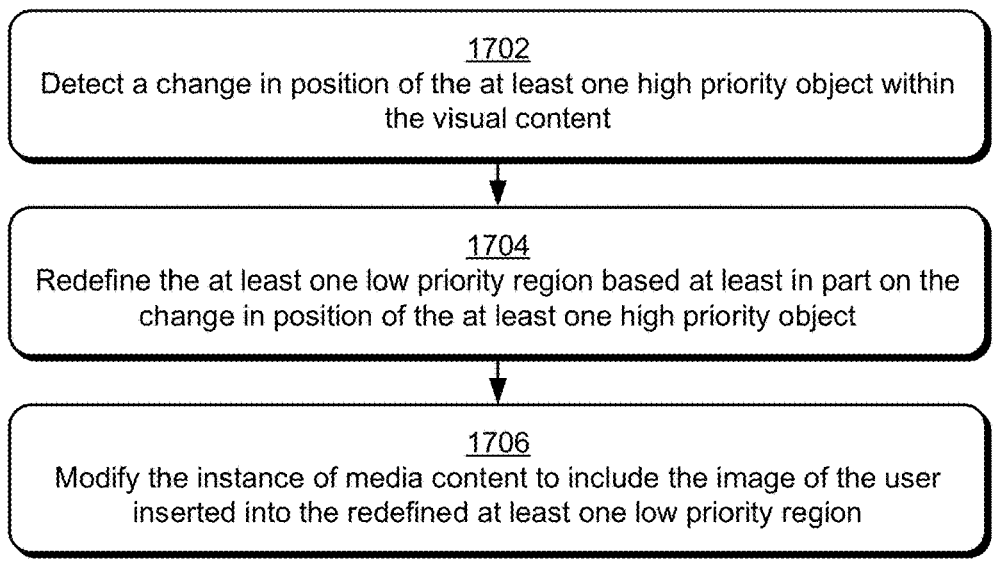
FIG. 17 illustrates an example method for modifying a position of a user image in accordance with one or more implementations.

FIG. 17 illustrates an example method 1700 for modifying a position of a user image in accordance with one or more implementations. At 1702 a change in position of the at least one high priority object is detected within the visual content. At 1704 the at least one low priority region is redefined based at least in part on the change in position of the at least one high priority object. At 1706 the instance of media content is modified to include the image of the user inserted into the redefined at least one low priority region.

Accordingly, implementations of user image presentation based on region priority provide ways for controlling presentation of user images in media content.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 18:
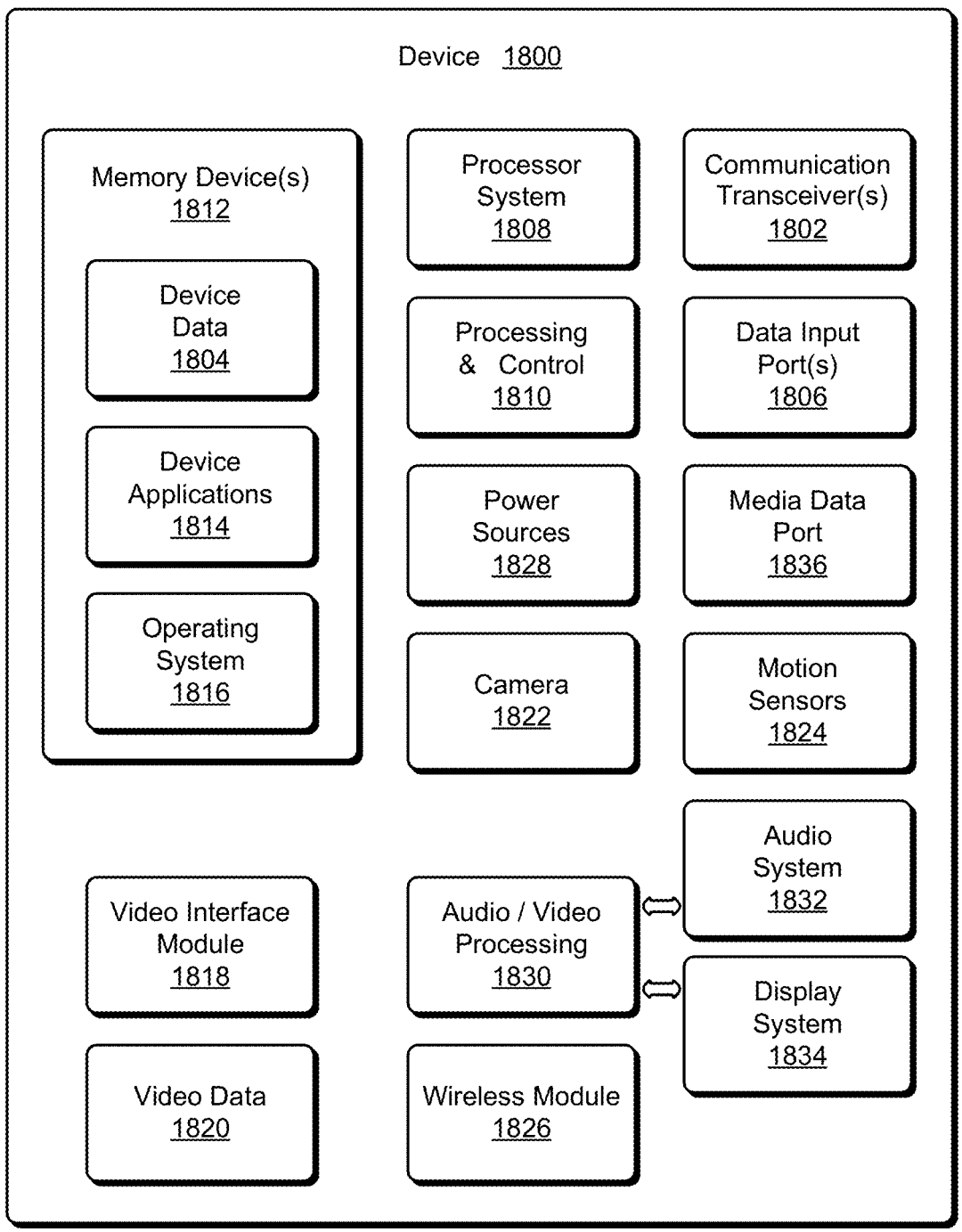
FIG. 18 illustrates various components of an example device in which aspects of user image presentation based on region priority can be implemented.

FIG. 18 illustrates various components of an example device 1800 in which aspects of user image presentation based on region priority can be implemented. The example device 1800 can be implemented as any of the devices described with reference to the previous FIGS. 1-17, such as any type of mobile device, mobile phone, mobile device, wearable device, tablet, computing, communication, entertainment, gaming, media playback, and/or other type of electronic device. For example, the client device 102 as shown and described with reference to FIGS. 1-17 may be implemented as the example device 1800.

The device 1800 includes communication transceivers 1802 that enable wired and/or wireless communication of device data 1804 with other devices. The device data 1804 can include any of device identifying data, device location data, wireless connectivity data, and wireless protocol data. Additionally, the device data 1804 can include any type of audio, video, and/or image data. Example communication transceivers 1802 include wireless personal area network (WPAN) radios compliant with various IEEE 1802.15 (Bluetooth™) standards, wireless local area network (WLAN) radios compliant with any of the various IEEE 1802.11 (Wi-Fi™) standards, wireless wide area network (WWAN) radios for cellular phone communication, wireless metropolitan area network (WMAN) radios compliant with various IEEE 1802.16 (WiMAX™) standards, and wired local area network (LAN) Ethernet transceivers for network data communication.

The device 1800 may also include one or more data input ports 1806 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1800 includes a processing system 1808 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1810. The device 1800 may further include any type of a system bus or other data and command transfer system that couples the various components within the device. A system bus can include any one or combination of different bus structures and architectures, as well as control and data lines.

The device 1800 also includes computer-readable storage memory 1812 (e.g., memory devices) that enable data storage, such as data storage devices that can be accessed by a computing device, and that provide persistent storage of data and executable instructions (e.g., software applications, programs, functions, and the like). Examples of the computer-readable storage memory 1812 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1800 may also include a mass storage media device.

The computer-readable storage memory 1812 provides data storage mechanisms to store the device data 1804, other types of information and/or data, and various device applications 1814 (e.g., software applications). For example, an operating system 1816 can be maintained as software instructions with a memory device and executed by the processing system 1808. The device applications may also include a device manager, such as any form of a control application, software application, signal-processing and control module, code that is native to a particular device, a hardware abstraction layer for a particular device, and so on. Computer-readable storage memory 1812 represents media and/or devices that enable persistent and/or non-transitory storage of information in contrast to mere signal transmission, carrier waves, or signals per se. Computer-readable storage memory 1812 do not include signals per se or transitory signals.

In this example, the device 1800 includes a capture module 1818 that implements aspects of user image presentation based on region priority and may be implemented with hardware components and/or in software as one of the device applications 1814. In an example, the capture module 1818 can be implemented as the capture module 122 described in detail above. In implementations, the capture module 1818 may include independent processing, memory, and logic components as a computing and/or electronic device integrated with the device 1800. The device 1800 also includes capture data 1820 for implementing aspects of user image presentation based on region priority and may include data from and/or utilized by the capture module 1818.

In this example, the example device 1800 also includes a camera 1822 and motion sensors 1824, such as may be implemented in an inertial measurement unit (IMU). The motion sensors 1824 can be implemented with various sensors, such as a gyroscope, an accelerometer, and/or other types of motion sensors to sense motion of the device. The various motion sensors 1824 may also be implemented as components of an inertial measurement unit in the device.

The device 1800 also includes a wireless module 1826, which is representative of functionality to perform various wireless communication tasks. For instance, for the client device 102, the wireless module 1826 can be leveraged to scan for and detect wireless networks, as well as negotiate wireless connectivity to wireless networks for the client device 102. The device 1800 can also include one or more power sources 1828, such as when the device is implemented as a mobile device. The power sources 1828 may include a charging and/or power system, and can be implemented as a flexible strip battery, a rechargeable battery, a charged super-capacitor, and/or any other type of active or passive power source.

The device 1800 also includes an audio and/or video processing system 1830 that generates audio data for an audio system 1832 and/or generates display data for a display system 1834. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1836. In implementations, the audio system and/or the display system are integrated components of the example device. Alternatively, the audio system and/or the display system are external, peripheral components to the example device.

Although implementations of user image presentation based on region priority have been described in language specific to features and/or methods, the subject of the appended claims is not necessarily limited to the specific features or methods described. Rather, the features and methods are disclosed as example implementations of user image presentation based on region priority, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

In some aspects, the techniques described herein relate to a system including: one or more processors implemented at least partially in hardware; and one or more computer-readable storage media storing instructions that are executable by the one or more processors to: receive a first video feed that includes primary content and a second video feed that includes an image of a user: process the primary content to identify at least one high priority region within the primary content and at least one low priority region within the primary content; and generate an instance of media content that includes the at least one high priority region and the image of the user inserted within the at least one low priority region.

In some aspects, the techniques described herein relate to a system, wherein the primary content includes one or more of a real world image captured via a camera or application content generated by an application.

In some aspects, the techniques described herein relate to a system, wherein to process the primary content, the instructions are executable by the one or more processors to: identify one or more active visual objects within the primary content; and identify the at least one high priority region to include the one or more active visual objects.

In some aspects, the techniques described herein relate to a system, wherein the primary content includes interactive content, and the one or more active visual objects include interactive visual objects within the interactive content.

In some aspects, the techniques described herein relate to a system, wherein the primary content includes game content, and the one or more active visual objects include game visual objects within the game content.

In some aspects, the techniques described herein relate to a system, wherein to identify the at least one low priority region, the instructions are executable by the one or more processors to identify the at least one low priority region as a region within the primary content as a region that does not include the one or more active visual objects.

In some aspects, the techniques described herein relate to a system, wherein to identify the at least one low priority region, the instructions are executable by the one or more processors to identify the at least one low priority region as a region of the primary content that avoids overlap with the one or more active visual objects.

In some aspects, the techniques described herein relate to a system, wherein to identify the at least one low priority region, the instructions are executable by the one or more processors to identify the at least one low priority region of the primary content as a region that avoids overlap with the at least one high priority region.

In some aspects, the techniques described herein relate to a system, wherein the instructions are executable by the one or more processors to: process the primary content to identify one or more high priority visual objects within the primary content; and identify the at least one high priority region to include the one or more high priority visual objects.

In some aspects, the techniques described herein relate to a system, wherein the instructions are executable by the one or more processors to: determine, during output of the instance of media content, that a change in visual arrangement of the primary content occurs to generate modified primary content: process the modified primary content to identify a second low priority region within the modified primary content, the second low priority region having a different position than the at least one low priority region; and generate a modified instance of media content that repositions the image of the user to be inserted within the second low priority region.

In some aspects, the techniques described herein relate to a system, wherein the instructions are executable by the one or more processors to use a timer to determine when to reposition the image of the user to be inserted within the second low priority region.

In some aspects, the techniques described herein relate to a method including: receiving a first video feed that includes visual content and a second video feed that includes an image of a user: processing the visual content to identify at least one high priority region within the visual content and a low priority region within the visual content; and generating an instance of media content that includes the at least one high priority region and the image of the user inserted within the low priority region.

In some aspects, the techniques described herein relate to a method, further including: identifying one or more active visual objects within the visual content; and identifying the at least one high priority region as a visual region that includes the one or more active visual objects.

In some aspects, the techniques described herein relate to a method, further including: determining, during output of the instance of media content, that a change in visual arrangement of the visual content occurs to generate modified primary content: processing the modified primary content to identify a second low priority region within the modified primary content, the second low priority region having a different position than the at least one low priority region; and generating a modified instance of media content that repositions the image of the user to be inserted within the second low priority region.

In some aspects, the techniques described herein relate to a method, further including using a timer to determine when to reposition the image of the user to be inserted within the second low priority region.

In some aspects, the techniques described herein relate to a system including: one or more processors implemented at least partially in hardware; and one or more computer-readable storage media storing instructions that are executable by the one or more processors to: receive a first video feed that includes visual content and a second video feed that includes an image of a user: process the visual content to identify at least one high priority object within the visual content and at least one low priority object within the visual content: define at least one high priority region based at least in part on the at least one high priority object, and at least one low priority region based at least in part on the at least one low priority object; and generate an instance of media content that includes the at least one high priority region and the image of the user inserted within the at least one low priority region.

In some aspects, the techniques described herein relate to a system, wherein the instructions are executable by the one or more processors to identify the at least one high priority object based at least in part on an object type for the at least one high priority object.

In some aspects, the techniques described herein relate to a system, wherein the instructions are executable by the one or more processors to: identify different visual objects within the visual content; and compare the visual objects to object priorities for different visual object types to identify the at least one high priority object within the visual content and the at least one low priority object within the visual content.

In some aspects, the techniques described herein relate to a system, wherein the object priorities are defined based at least in part on user specified configuration of visual object priorities.

In some aspects, the techniques described herein relate to a system, wherein the instructions are executable by the one or more processors to: detect a change in position of the at least one high priority object within the visual content; redefine the at least one low priority region based at least in part on the change in position of the at least one high priority object; and modify the instance of media content to include the image of the user inserted into the redefined at least one low priority region.

The invention claimed is:

1. A system comprising:
one or more processors implemented at least partially in hardware; and
one or more computer-readable storage media storing instructions that are executable by the one or more processors to:
receive a first video feed that includes primary content and a second video feed that includes an image of a user;
process the primary content to identify at least one high priority region within the primary content and at least one low priority region within the primary content;
generate an instance of media content that includes the at least one high priority region and the image of the user inserted within the at least one low priority region;
determine, during output of the instance of media content, that a change in visual arrangement of the primary content occurs to generate modified primary content;
process the modified primary content to identify a second low priority region within the modified primary content, the second low priority region having a different position than the at least one low priority region; and
generate a modified instance of media content that repositions the image of the user to be inserted within the second low priority region.

2. The system of claim 1, wherein the primary content comprises one or more of a real world image captured via a camera or application content generated by an application.

3. The system of claim 1, wherein to process the primary content, the instructions are executable by the one or more processors to:
identify one or more active visual objects within the primary content; and
identify the at least one high priority region to include the one or more active visual objects.

4. The system of claim 1, wherein to identify the at least one low priority region, the instructions are executable by the one or more processors to identify the at least one low priority region of the primary content as a region that avoids overlap with the at least one high priority region.

5. The system of claim 1, wherein the instructions are executable by the one or more processors to:
   process the primary content to identify one or more high priority visual objects within the primary content; and
   identify the at least one high priority region to include the one or more high priority visual objects.

6. The system of claim 1, wherein the instructions are executable by the one or more processors to use a timer to determine when to reposition the image of the user to be inserted within the second low priority region.

7. The system of claim 3, wherein the primary content comprises interactive content, and the one or more active visual objects comprise interactive visual objects within the interactive content.

8. The system of claim 3, wherein the primary content comprises game content, and the one or more active visual objects comprise game visual objects within the game content.

9. The system of claim 3, wherein to identify the at least one low priority region, the instructions are executable by the one or more processors to identify the at least one low priority region as a region within the primary content as a region that does not include the one or more active visual objects.

10. The system of claim 3, wherein to identify the at least one low priority region, the instructions are executable by the one or more processors to identify the at least one low priority region as a region of the primary content that avoids overlap with the one or more active visual objects.

11. A method comprising:
    receiving a first video feed that includes visual content and a second video feed that includes an image of a user;
    processing the visual content to identify at least one high priority region within the visual content and a first low priority region within the visual content;
    generating an instance of media content that includes the at least one high priority region and the image of the user inserted within the first low priority region;
    determining, during output of the instance of media content, that a change in visual arrangement of the visual content occurs to generate modified primary content;
    processing the modified primary content to identify a second low priority region within the modified primary content, the second low priority region having a different position than the first low priority region; and
    generating a modified instance of media content that repositions the image of the user to be inserted within the second low priority region.

12. The method of claim 11, further comprising:
    identifying one or more active visual objects within the visual content; and
    identifying the at least one high priority region as a visual region that includes the one or more active visual objects.

13. The method of claim 11, further comprising using a timer to determine when to reposition the image of the user to be inserted within the second low priority region.

14. The method of claim 11, further comprising:
    processing the visual content to identify one or more high priority visual objects within the visual content; and
    identifying the at least one high priority region to include the one or more high priority visual objects.

15. The method of claim 12, further comprising:
    identifying the first low priority region as a region within the visual content as a region that does not include the one or more active visual objects.

16. The method of claim 12, further comprising:
    identifying the first low priority region as a region of the visual content that avoids overlap with the one or more active visual objects.

17. A system comprising:
    one or more processors implemented at least partially in hardware; and
    one or more computer-readable storage media storing instructions that are executable by the one or more processors to:
       receive a first video feed that includes visual content and a second video feed that includes an image of a user;
       process the visual content to identify at least one high priority object within the visual content and at least one low priority object within the visual content;
       define at least one high priority region based at least in part on the at least one high priority object, and at least one low priority region based at least in part on the at least one low priority object;
       generate an instance of media content that includes the at least one high priority region and the image of the user inserted within the at least one low priority region; and
       identify the at least one high priority object based at least in part on an object type for the at least one high priority object.

18. The system of claim 17, wherein the instructions are executable by the one or more processors to:
    identify different visual objects within the visual content; and
    compare the visual objects to object priorities for different visual object types to identify the at least one high priority object within the visual content and the at least one low priority object within the visual content.

19. The system of claim 17, wherein the instructions are executable by the one or more processors to:
    detect a change in position of the at least one high priority object within the visual content;
    redefine the at least one low priority region based at least in part on the change in position of the at least one high priority object; and
    modify the instance of media content to include the image of the user inserted into the redefined at least one low priority region.

20. The system of claim 18, wherein the object priorities are defined based at least in part on user specified configuration of visual object priorities.

* * * * *